US010855696B2

(12) United States Patent
Overson et al.

(10) Patent No.: US 10,855,696 B2
(45) Date of Patent: Dec. 1, 2020

(54) VARIABLE RUNTIME TRANSPILATION

(71) Applicant: Shape Security, Inc., Mountain View, CA (US)

(72) Inventors: Jarrod S. Overson, Santa Clara, CA (US); Ariya Hidayat, Mountain View, CA (US); Michael Ficarra, Sunnyvale, CA (US); Bei Zhang, Mountain View, CA (US); Justin Call, Santa Clara, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 48 days.

(21) Appl. No.: 15/059,080

(22) Filed: Mar. 2, 2016

(65) Prior Publication Data

US 2017/0257385 A1 Sep. 7, 2017

(51) Int. Cl.
*H04L 29/06* (2006.01)
*H04L 29/08* (2006.01)

(52) U.S. Cl.
CPC ...... *H04L 63/1416* (2013.01); *H04L 63/1433* (2013.01); *H04L 63/1441* (2013.01); *H04L 67/02* (2013.01); *H04L 67/42* (2013.01)

(58) Field of Classification Search
CPC ....... G06F 21/10; G06F 21/565; G06F 21/125
USPC ................. 726/5–23; 713/150–155; 709/224
See application file for complete search history.

(56) References Cited

U.S. PATENT DOCUMENTS

| | | | |
|---|---|---|---|
| 5,509,076 A | 4/1996 | Sprunk | |
| 6,654,707 B2 | 11/2003 | Wynn | |
| 7,107,347 B1 | 9/2006 | Cohen | |
| 7,398,553 B1 | 7/2008 | Li | |
| 7,424,720 B2 | 9/2008 | Chagoly | |
| 7,849,502 B1 | 12/2010 | Bloch et al. | |

(Continued)

FOREIGN PATENT DOCUMENTS

WO    WO 2017/074622    5/2017

OTHER PUBLICATIONS

CTFR, dated Jan. 25, 2018, re: Siying Yang, U.S. Appl. No. 14/942,769, filed Nov. 16, 2015.

(Continued)

*Primary Examiner* — Shin-Hon (Eric) Chen
*Assistant Examiner* — Viral S Lakhia
(74) *Attorney, Agent, or Firm* — Troutman Pepper Hamilton Sanders LLP (Rochester)

(57) ABSTRACT

In an approach, an apparatus comprises: one or more processors; a processor logic coupled to the one or more processors and configured to: intercept, from a client computer, a request directed to a server computer that identifies a purported user agent executing on the client computer; send, to the server computer, the request from the client computer; intercept, from the server computer, one or more original instructions to be executed by the purported user agent of the client computer; determine one or more features supported by the purported user agent that are not utilized by the one or more original instructions; transform the one or more original instructions into one or more revised instructions which, when executed by the purported user agent, cause the purported user agent to utilize the one or more features; send, to the client computer, the one or more revised instructions.

28 Claims, 6 Drawing Sheets

(56) References Cited

U.S. PATENT DOCUMENTS

| | | | |
|---|---|---|---|
| 7,870,610 B1* | 1/2011 | Mitchell | G06F 21/53 |
| | | | 726/22 |
| 8,195,953 B1 | 6/2012 | Yue | |
| 8,578,499 B1 | 11/2013 | Zhu | |
| 8,590,014 B1* | 11/2013 | Haugsnes | G06F 21/31 |
| | | | 726/3 |
| 8,615,804 B2 | 12/2013 | Mui et al. | |
| 8,650,648 B2 | 2/2014 | Howard et al. | |
| 8,683,596 B2* | 3/2014 | Amit | G06F 21/52 |
| | | | 709/225 |
| 8,713,684 B2 | 4/2014 | Bettini | |
| 8,726,394 B2 | 5/2014 | Maor | |
| 8,739,284 B1 | 5/2014 | Gardner | |
| 8,752,208 B2 | 6/2014 | Shulman | |
| 8,763,071 B2* | 6/2014 | Sinha | H04L 67/306 |
| | | | 726/1 |
| 8,843,820 B1 | 9/2014 | Kay | |
| 8,849,985 B1 | 9/2014 | Colton | |
| 8,892,687 B1* | 11/2014 | Call | H04L 29/06972 |
| | | | 709/217 |
| 8,914,878 B2* | 12/2014 | Burns | H04L 63/1441 |
| | | | 726/22 |
| 8,935,773 B2* | 1/2015 | Stavrou | G06F 21/566 |
| | | | 726/12 |
| 8,954,583 B1* | 2/2015 | Zhou | H04L 67/42 |
| | | | 709/224 |
| 8,997,226 B1* | 3/2015 | Call | G06F 21/552 |
| | | | 709/224 |
| 9,043,924 B2 | 5/2015 | Maor | |
| 9,158,893 B2 | 10/2015 | Call | |
| 9,225,729 B1 | 12/2015 | Moen | |
| 9,225,737 B2 | 12/2015 | Call | |
| 9,258,328 B2 | 2/2016 | Ibatullin et al. | |
| 9,456,050 B1 | 9/2016 | Lepeska | |
| 9,537,888 B1 | 1/2017 | McClintock | |
| 9,609,006 B2 | 3/2017 | Call | |
| 9,628,498 B1 | 4/2017 | Aziz | |
| 9,635,039 B1* | 4/2017 | Islam | H04L 63/1425 |
| 9,639,699 B1 | 5/2017 | Kurupati | |
| 9,646,140 B2* | 5/2017 | Horadan | G06F 21/10 |
| 9,680,850 B2* | 6/2017 | Rapaport | H04L 63/1416 |
| 9,686,300 B1 | 6/2017 | Kurupati | |
| 9,705,902 B1 | 7/2017 | Call | |
| 9,736,147 B1* | 8/2017 | Mead | H04L 63/083 |
| 9,767,263 B1* | 9/2017 | McInerny | G06F 21/31 |
| 9,825,928 B2* | 11/2017 | Lelcuk | H04L 63/1408 |
| 9,906,544 B1 | 2/2018 | Kurupati | |
| 9,942,228 B2* | 4/2018 | Hauser | H04L 63/083 |
| 10,165,004 B1 | 12/2018 | Mehta | |
| 10,178,114 B2* | 1/2019 | Safruti | H04L 67/02 |
| 10,298,599 B1* | 5/2019 | Zhang | H04L 67/42 |
| 2002/0194219 A1 | 12/2002 | Bradley | |
| 2005/0108554 A1 | 5/2005 | Rubin | |
| 2005/0172338 A1 | 8/2005 | Sandu | |
| 2005/0198099 A1 | 9/2005 | Motsinger | |
| 2006/0101047 A1 | 5/2006 | Rice | |
| 2006/0174323 A1 | 8/2006 | Brown | |
| 2006/0195588 A1 | 8/2006 | Pennington | |
| 2006/0230288 A1 | 10/2006 | Fox | |
| 2007/0088955 A1 | 4/2007 | Lee | |
| 2007/0234070 A1 | 10/2007 | Horning | |
| 2008/0208785 A1 | 8/2008 | Trefler | |
| 2008/0320567 A1 | 12/2008 | Shulman | |
| 2009/0199297 A1 | 8/2009 | Jarrett | |
| 2010/0088404 A1 | 4/2010 | Mani | |
| 2010/0106611 A1 | 4/2010 | Paulsen | |
| 2010/0142382 A1 | 6/2010 | Jungck et al. | |
| 2010/0186089 A1 | 7/2010 | Fu | |
| 2010/0218253 A1 | 8/2010 | Andrew | |
| 2010/0240449 A1* | 9/2010 | Corem | A63F 13/12 |
| | | | 463/29 |
| 2011/0035733 A1 | 2/2011 | Horning | |
| 2011/0225234 A1 | 9/2011 | Amit | |
| 2011/0231305 A1 | 9/2011 | Winters | |
| 2012/0036576 A1 | 2/2012 | Iyer | |
| 2012/0090030 A1* | 4/2012 | Rapaport | H04L 63/1441 |
| | | | 726/23 |
| 2012/0255006 A1 | 10/2012 | Aly et al. | |
| 2012/0324236 A1 | 12/2012 | Srivastava | |
| 2013/0047255 A1 | 2/2013 | Dalcher | |
| 2013/0086679 A1 | 4/2013 | Beiter | |
| 2013/0219492 A1 | 8/2013 | Call | |
| 2013/0239195 A1 | 9/2013 | Turgeman | |
| 2013/0273882 A1 | 10/2013 | Walsh | |
| 2014/0040051 A1 | 2/2014 | Ovick | |
| 2014/0082366 A1* | 3/2014 | Engler | H04L 9/3226 |
| | | | 713/176 |
| 2014/0096194 A1 | 4/2014 | Bhogavilli | |
| 2014/0101236 A1 | 4/2014 | Dietrich | |
| 2014/0208198 A1 | 7/2014 | Ayoub | |
| 2014/0282872 A1* | 9/2014 | Hansen | H04L 63/102 |
| | | | 726/3 |
| 2014/0282891 A1* | 9/2014 | Frechette | H04L 63/083 |
| | | | 726/4 |
| 2014/0298469 A1 | 10/2014 | Marion | |
| 2014/0304816 A1 | 10/2014 | Klein | |
| 2014/0310392 A1 | 10/2014 | Ho | |
| 2015/0067031 A1 | 3/2015 | Acharya | |
| 2015/0067866 A1 | 3/2015 | Ibatullin | |
| 2015/0112892 A1 | 4/2015 | Kaminsky | |
| 2015/0262183 A1 | 9/2015 | Gervais | |
| 2015/0278491 A1 | 10/2015 | Horning | |
| 2015/0281263 A1 | 10/2015 | McLaughlin | |
| 2015/0358338 A1 | 12/2015 | Zeitlin | |
| 2015/0379266 A1* | 12/2015 | McLaughlin | G06F 21/10 |
| | | | 726/23 |
| 2016/0005029 A1 | 1/2016 | Ivey | |
| 2016/0072829 A1 | 3/2016 | Call | |
| 2016/0080345 A1* | 3/2016 | Safruti | H04L 67/02 |
| | | | 726/6 |
| 2016/0119344 A1 | 4/2016 | Freitas Fortuna dos Santos | |
| 2016/0132214 A1* | 5/2016 | Koushik | H04L 63/10 |
| | | | 715/741 |
| 2016/0142438 A1* | 5/2016 | Pastore | G06F 21/554 |
| | | | 713/171 |
| 2016/0147992 A1* | 5/2016 | Zhao | H04L 63/102 |
| | | | 726/22 |
| 2016/0182537 A1* | 6/2016 | Tatourian | H04L 63/1416 |
| | | | 726/23 |
| 2016/0191554 A1 | 6/2016 | Kaminsky | |
| 2016/0342793 A1 | 11/2016 | Hidayat | |
| 2016/0344769 A1 | 11/2016 | Li | |
| 2016/0378989 A1 | 12/2016 | Park | |
| 2017/0048260 A1 | 2/2017 | Peddemors | |
| 2017/0076206 A1* | 3/2017 | Lastras-Montano | G06F 16/3344 |
| 2017/0201540 A1 | 7/2017 | Call | |
| 2017/0235954 A1 | 8/2017 | Kurupati | |
| 2017/0237766 A1 | 8/2017 | Mattson | |
| 2017/0257383 A1 | 9/2017 | Ficarra | |
| 2017/0257385 A1 | 9/2017 | Overson | |
| 2017/0293748 A1 | 10/2017 | Kurupati | |
| 2018/0205747 A1 | 7/2018 | Ficarra | |
| 2018/0255154 A1 | 9/2018 | Li | |
| 2018/0302437 A1* | 10/2018 | Pastore | H04L 63/1466 |
| 2019/0081977 A1 | 3/2019 | Yang | |
| 2019/0141064 A1 | 5/2019 | Call | |
| 2019/0182251 A1 | 6/2019 | Jampani | |
| 2019/0245858 A1 | 8/2019 | Idika | |
| 2019/0268359 A1 | 8/2019 | Zhang | |
| 2019/0327265 A1 | 10/2019 | Zhao | |
| 2019/0364019 A1 | 11/2019 | Yang | |
| 2019/0373012 A1 | 12/2019 | Mattson | |
| 2019/0394228 A1 | 12/2019 | Yang | |

OTHER PUBLICATIONS

CTNF, dated Feb. 7, 2017, re: Daniel G. Moen, U.S. Appl. No. 14/980,231, filed Dec. 28, 2015.

CTFR, dated Jan. 10, 2018, re: Bei Zhang, U.S. Appl. No. 14/859,084, filed Sep. 18, 2015.

(56) References Cited

OTHER PUBLICATIONS

NOA, dated Jan. 25, 2018, re: Zhiwei Li, U.S. Appl. No. 14/718,736, filed May 21, 2015.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.
CTNF, dated Mar. 9, 2017, re: Siying Yang, U.S. Appl. No. 14/925,547, filed Oct. 28, 2015.
CTNF, dated Jun. 1, 2017, re: Siying Yang, U.S. Appl. No. 14/942,769, filed Nov. 16, 2015.
CTNF, dated Jun. 2, 2017, re: Ariya Hidayat, U.S. Appl. No. 15/224,978, filed Aug. 1, 2016.
CTNF, dated Apr. 7, 2017, re: Yao Zhao, U.S. Appl. No. 14/861,906, filed Sep. 22, 2015.
ctnf, dated May 25, 2017, re: Daniel G. Moen, U.S. Appl. No. 14/980,231, filed Dec. 28, 2015.
CTNF, dated Jul. 26, 2017, re: Bei Zhang, U.S. Appl. No. 14/859,084, filed Sep. 18, 2015.
CTNF, dated Jun. 21, 2017, re: Zhiwei Li, U.S. Appl. No. 14/718,736, filed May 21, 2015.
CTNF, dated Aug. 30, 2017, re: Justin D. Call, U.S. Appl. No. 15/470,715, filed Mar. 27, 2017.
CTFR, dated Sep. 5, 2017, re: Siying Yang, U.S. Appl. No. 14/925,547, filed Oct. 28, 2015.
CTNF, dated Oct. 19, 2017, re: Jarrod S. Overson, U.S. Appl. No. 15/059,080, filed Mar. 2, 2016.
International Search Report, dated Feb. 16, 2017, PCT/US16/53472.
NOA, dated Oct. 25, 2017, re: Michael J. Ficarra, U.S. Appl. No. 15/060,322, filed Mar. 3, 2016.
CTNF, dated Nov. 13, 2017, re: Nwokedi Idika, U.S. Appl. No. 14/728,596, filed Jun. 2, 2015.
CTNF, dated Dec. Dec. 13, 2017, re: Justin D. Call, U.S. Appl. No. 15/645,787, filed Jul. 10, 2017.
NOA, dated Dec. 18, 2017, re: Yao Zhao, U.S. Appl. No. 14/861,906, filed Sep. 22, 2015.
NOA, dated Jan. 5, 2018, re: Yao Zhao, U.S. Appl. No. 14/861,906, filed Sep. 22, 2015.
NOA, dated Jan. 9, 2018, re: Justin D. Call, U.S. Appl. No. 15/470,715, filed Mar. 27, 2017.
NOA, dated Feb. 7, 2019, re: Siying Yang, U.S. Appl. No. 16/190,015, filed Nov. 13, 2018.
CTNF, dated Mar. 30, 2018, re: Michael J. Ficarra, U.S. Appl. No. 15/060,380, filed Mar. 3, 2016.
CTNF, dated Apr. 19, 2018, re: Michael J. Ficarra, U.S. Appl. No. 15/919,034, filed Mar. 12, 2018.
CTNF, dated May 15, 2018, re: Marc R. Hansen, U.S. Appl. No. 15/202,755, filed Jul. 6, 2016.
CTFR, dated May 10, 2018, re: Nwokedi Idika, U.S. Appl. No. 14/728,596, filed Jun. 2, 2015.
CTNF, dated Feb. 16, 2018, re: Siying Yang, U.S. Appl. No. 15/068,468, filed Mar. 11, 2016.
NOA, dated May 18, 2018 re: Siying Yang, U.S. Appl. No. 14/942,769, filed Nov. 16, 2015.
CTNF, dated May 23, 2018, re: Bei Zhang, U.S. Appl. No. 14/859,084, filed Sep. 18, 2015.
CTFR, dated May 17, 2018, re: Jarrod S. Overson, U.S. Appl. No. 15/059,080, filed Mar. 2, 2016.
CTNF, dated Jun. 7, 2018, re: Siying Yang, U.S. Appl. No. 14/925,547, filed Oct. 28, 2015.
CTNF, dated Jun. 29, 2018, re: Timothy Dylan Peacock, U.S. Appl. No. 15/137,824, filed Apr. 25, 2016.
CTNF, dated Feb. 1, 2018, re: Nwokedi Idika, U.S. Appl. No. 15/204,710, filed Jul. 7, 2016.
NOA, dated Aug. 13, 2018, re: Daniel G. Moen, U.S. Appl. No. 14/980,231, filed Dec. 28, 2015.
NOA, dated Sep. 5, 2018, re: Daniel G. Moen, U.S. Appl. No. 14/980,231, filed Dec. 28, 2015.
NOA, dated Sep. 17, 2018, re: Siying Yang, U.S. Appl. No. 14/942,769, filed Nov. 16, 2015.
NOA, dated Sep. 5, 2018, re: Michael J. Ficarra, U.S. Appl. No. 15/919,034, filed on Mar. 12, 2018.
NOA, dated Jul. 5, 2018, re: Siying Yang, U.S. Appl. No. 15/068,468, filed Mar. 11, 2016.
NOA, dated Sep. 19, 2018, re: Nwokedi Idika, U.S. Appl. No. 15/204,710, filed Jul. 7, 2016.
CTNF, dated Sep. 19, 2018, re: Eli Mattson, U.S. Appl. No. 15/430,224, filed Feb. 10, 2017.
CTFR, dated Sep. 11, 2018, re: Michael J. Ficarra, U.S. Appl. No. 15/060,380, filed Mar. 3, 2016.
CTFR, dated Nov. 1, 2018, re: Marc R. Hansen, U.S. Appl. No. 15/202,755, filed Jul. 6, 2016.
CTFR, dated Nov. 30, 2018, re: Siying Yang, U.S. Appl. No. 14/925,547, filed Oct. 28, 2015.
NOA, dated Nov. 27, 2018, re: Nwokedi Idika, U.S. Appl. No. 15/204,710, filed Jul. 7, 2016.
CTNF, dated Oct. 5, 2018, re: Zhiwei Li, U.S. Appl. No. 15/968,573, filed May 1, 2018.
NOA, dated Sep. 12, 2018, re: Justin D. Call, U.S. Appl. No. 15/645,787, filed Jul. 10, 2017.
CTNF, dated Nov. 29, 2018, re: Jarrod S. Overson, U.S. Appl. No. 15/059,080, filed Mar. 2, 2016.
NOA, dated Jan. 3, 2019, re: Bei Zhang, U.S. Appl. No. 14/859,084, filed Sep. 18, 2015.
CTNF, dated Jan. 24, 2019, re: Nwokedi Idika, U.S. Appl. No. 14/728,596, filed Jun. 2, 2015.
NOA, dated Feb. 6, 2019, re: Eli Mattson, U.S. Appl. No. 15/430,224, filed Feb. 10, 2017.
NOA, dated Mar. 25, 2019, re: Siying Yang, U.S. Appl. No. 14/925,547, filed Oct. 28, 2015.
CTFR, dated Apr. 15, 2019, re: Jarrod S. Overson, U.S. Appl. No. 15/059,080, filed Mar. 2, 2016.
NOA, dated Mar. 11, 2019, re: Zhiwei Li, U.S. Appl. No. 15/968,573, filed May 1, 2018.
CTNF, dated May 15, 2019, re: Michael J. Ficarra, U.S. Appl. No. 15/060,380, filed Mar. 3, 2016.
NOA, dated Jun. 3, 2019, re: Siying Yang, U.S. Appl. No. 16/190,015, filed Nov. 13, 2018.
CTFR, dated Jul. 1, 2019, re: Nwokedi Idika , U.S. Appl. No. 14/728,596, filed Jun. 2, 2015.
U.S. Appl. No. 16/190,015, filed Mar. 14, 2019, Sying Yang.
CTNF, dated Sep. 4, 2019, re: Timothy Dylan Peacock, U.S. Appl. No. 15/137,824, filed on Apr. 25, 2016.
CTNF, dated Aug. 14, 2019, re: Nwokedi Idika, U.S. Appl. No. 16/236,520, filed on Dec. 30, 2018.
CTNF, dated Sep. 4, 2019, re: Justin D. Call, U.S. App.. No. 16/234,848, filed on Dec. 28, 2018.
CTNF, dated Sep. 4, 2019, re: Bei Zhang, U.S. Appl. No. 16/413,451, filed on May 15, 2019.
NOA, dated Oct. 3, 2019, re: Marc R. Hansen, U.S. Appl. No. 15/202,755, filed on Jul. 6, 2016.
CTNF, dated Sep. 24, 2019, re: Ganesh Jampani, U.S. Appl. No. 16/259,890, filed on Jan. 28, 2019.
NOA, dated Oct. 17, 2019, re: Michael J. Ficarra, U.S. Appl. No. 15/060,380, filed on Mar. 3, 2016.
NOA, dated Dec. 3, 2019, re: Nwokedi Idika, U.S. Appl. No. 16/236,520, filed on Dec. 30, 2018.
CTNF, dated Dec. 11, 2019, re: Siying Yang, U.S. Appl. No. 16/236,519, filed on Dec. 30, 2018.
NOA, dated Dec. 11, 2019, re: Jarrod S. Overson, U.S. Appl. No. 15/059,080, filed on Mar. 2, 2016.
CTFR, dated Jan. 29, 2020, re: Timothy Dylan Peacock, U.S. Appl. No. 15/137,824, filed on Apr. 25, 2016.
CTNF, dated Jan. 27, 2020, re: Ganesh Jampani, U.S. Appl. No. 16/259,890, filed on Jan. 28, 2019.
Hofmeyer et al., "Intrusion Detection Using Sequences of Systems," Journal of Computer Security 6, pp. 151-180, Aug. 1998.

* cited by examiner

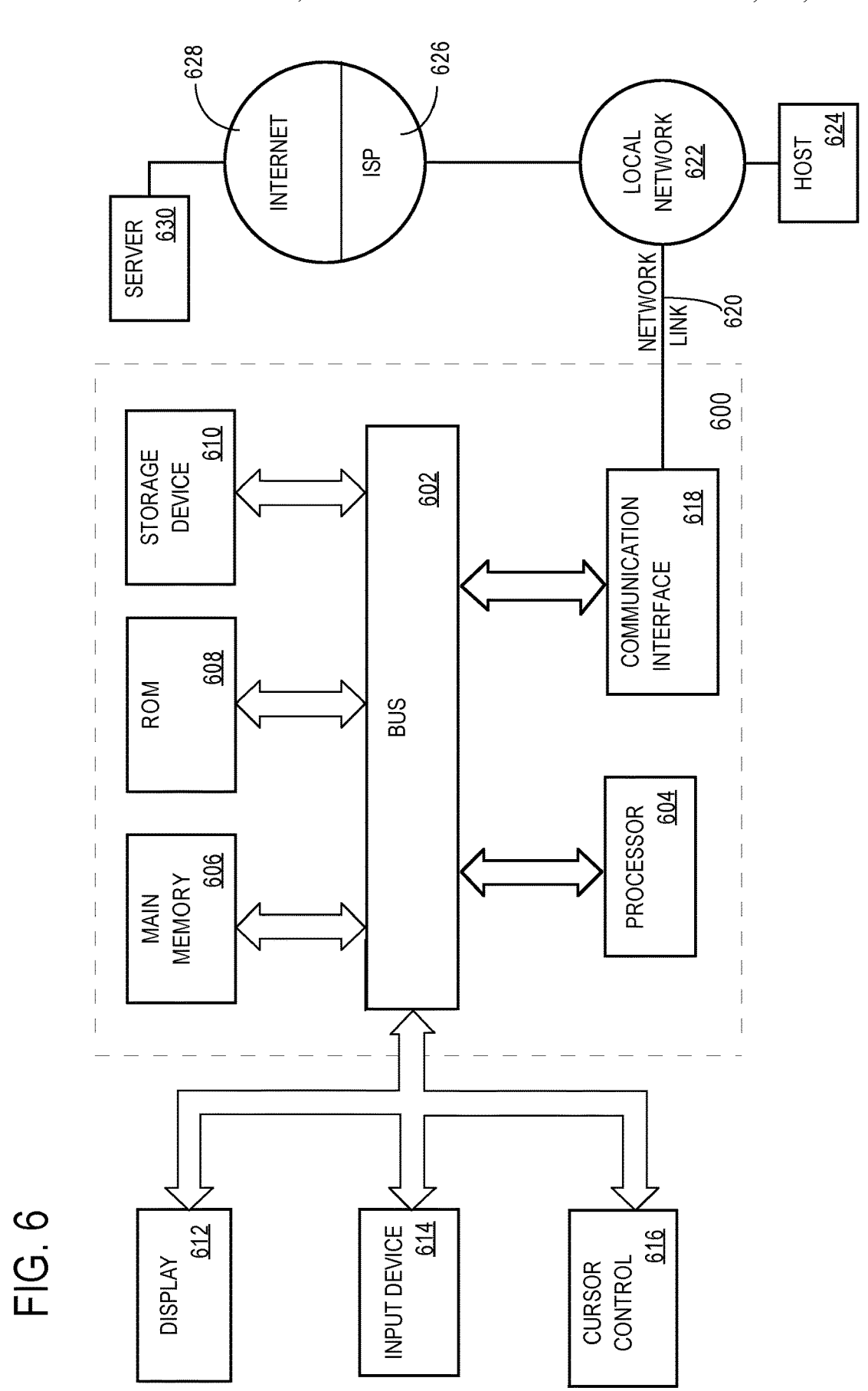

VARIABLE RUNTIME TRANSPILATION

FIELD OF THE DISCLOSURE

The present disclosure generally relates to security techniques applicable to client/server systems, and relates more specifically to techniques for detecting whether a client computer interacting with server computers through an intermediary computer is of a purported type and/or optimizing content for the purported type. SUGGESTED GROUP ART UNIT: 2447; SUGGESTED CLASSIFICATION: 709/217.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user, such as a mouse click indicating that the user selected an object defined in the instructions, such as a link, a browser may send a request based on the selected object to the web server. The request may be a request for data and/or include data to be processed by the web server.

Attackers may use software, often referred to as a "bot" or "headless browser", which imitates a browser by receiving instructions from a web server and generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters to simulate a user submitting data to a web server through a browser.

Attackers may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, brute force attacks, click fraud, DDoS attacks, bidding wars, and stack fingerprinting attacks. As a specific example, a malicious user may cause a bot to traverse through pages of a web site and collect private and/or proprietary data, such as who is connected with whom on a particular social networking web site.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

BRIEF DESCRIPTION OF THE DRAWINGS

In the drawings:

FIG. 6 illustrates an example computer system 600 upon which an embodiment of the invention may be implemented.

DETAILED DESCRIPTION

Figure 1:
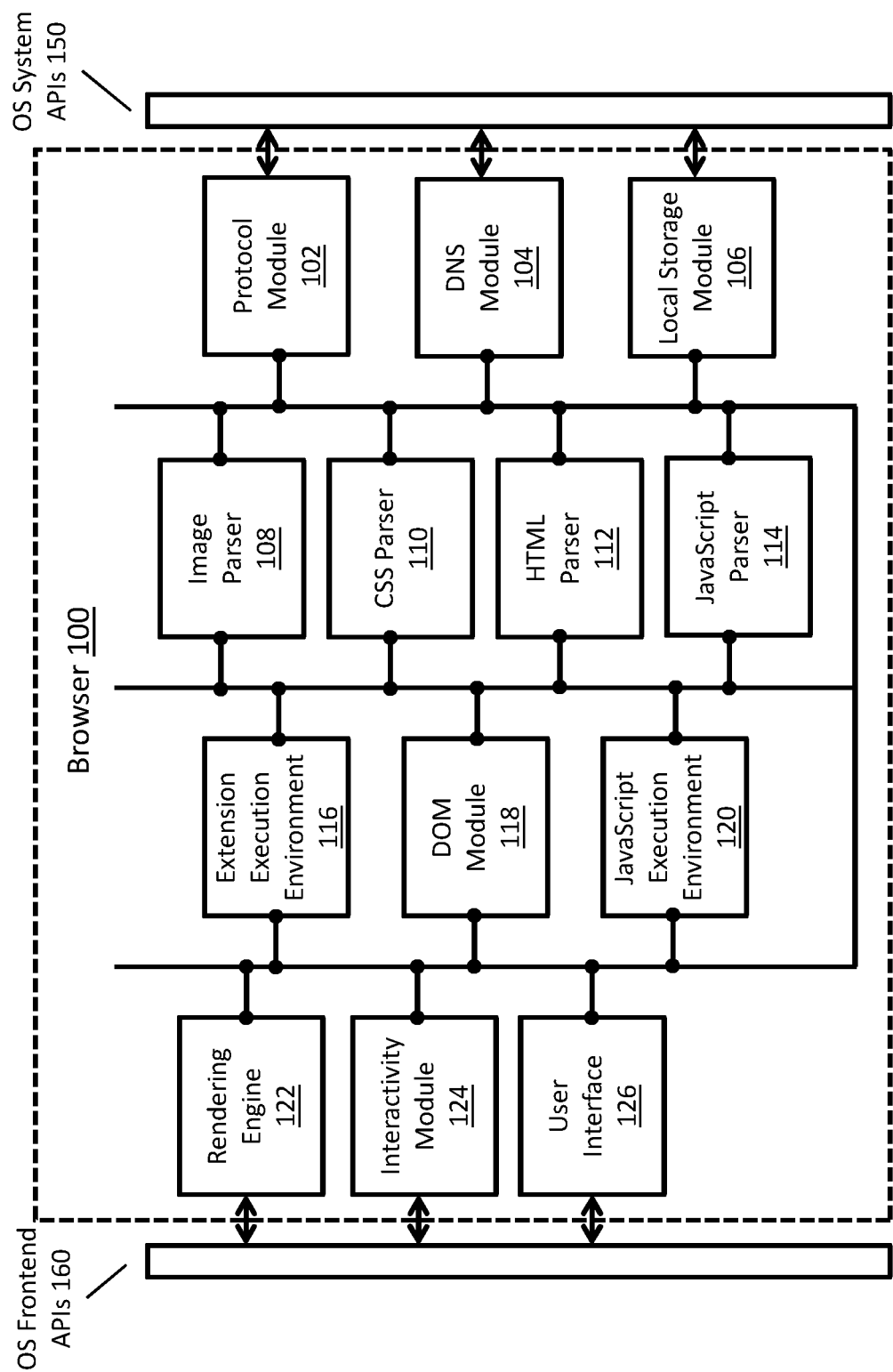
FIG. 1 illustrates functional units of a web browser according to an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Browsers, Bots, and Attacks
      2.1 Example Browser Anatomy
      2.2 Example Bot or "Headless Browser" Anatomy
   3.0 Distinguishing between Browsers Operated by Legitimate Users and Bots
      3.1 Determining the Validity of a Browser
      3.2 Optimizing Based on a Browser
      3.3 Transpiler Overview
      3.4 Example Features
         3.4.1 Syntax Example
         3.4.2 Dependency Removal Example
         3.4.3 Shim Example
         3.4.4 Enforcing Runtime Example
   4.0 Example Network Topology that Detects whether a Browser is a Legitimate Browser or a Bot
      4.1 Web Infrastructure
      4.2 Intermediary Computer
         4.2.1 Protocol Client Logic
         4.2.2 Processing Logic
         4.2.3 Injection logic
         4.2.4 Transpiler Logic
         4.2.5 Protocol Server Logic
         4.2.6 Bot check logic
         4.2.7 Reverse logic
         4.2.8 Configurations
         4.2.9 Storage
      4.3 Browser
   5.0 Process Overview
      5.1 Intercepting Instructions from a Content Server Computer
      5.2 Injecting Features
      5.3 Determining whether a Browser is a Legitimate and/or a Bot
      5.4 Responding to a Browser that is Determined to be a Bot
      5.5 Responding to a Browser that is Determine to be Legitimate 6.0 Optimization Only Embodiments
7.0 Implementation Mechanisms—Hardware Overview
8.0 Other Aspects of Disclosure
9.0 Additional Disclosure
1.0 General Overview As described above, attackers often utilize bots that are designed to mimic the behavior of user agents, such as web-browsers. Depending on how closely the bots can emulate the behavior of the user agents, the task of separating requests generated by a bot from requests generated by a legitimate user agent can be particularly difficult. However, in many cases bots are designed to emulate some base functionality expected of user agents, but might not implement all the features of the particular user agent that the bot purports to be. For instance, a bot implemented as a "headless browser" may identify itself in a Hypertext Transfer Protocol (HTTP) request as a particular user agent (such as Firefox, Chrome, Internet Explorer, and so forth) and be capable of processing a baseline of JavaScript instructions received from a web service, but the bot may not implement all of the features of the purported user agent that could be accessed via JavaScript (or other) instructions. Furthermore, the legitimate user agent might be able to process instructions that use specific types of syntax that the bot is not configured to handle.

As a more concrete example, the bot may provide basic functionality to process JavaScript, but may omit logic capable of performing particular types of encoding/decoding for text, images, video, and other data that the purported user agent would be able to perform. In some cases, these features may be rarely used or deprecated features that are still supported by the legitimate user agent, but are almost never actually encountered in practice. As a result, the attacker may overlook emulating those particular aspects of the purported user agent when implementing the bot. In addition, many web services avoid using features that are unique to particular user agents in order to efficiently provide service to a wide variety of agents, further decreasing the need for the attacker to emulate esoteric features of the purported user agent. Furthermore, even if the hot does emulate those features, the features may be emulated in such a way as to produce behavior that diverges from the expected behavior of the legitimate user agent.

Thus, one way to distinguish between bots and legitimate user agents is to provide the requester with instructions that utilize a feature of the purported agent and observe whether the requestor is able to provide a correct (or any) response. For example, in the case of bots emulating a browser, the bot may be unable to obtain links or submit data via form fields if the proper functionality of those widgets is hidden within features that the bot is unable to process. As another example, particular browsers may allow JavaScript to run to a particular depth of recursion before throwing an exception, which a bot might not emulate. Thus, instructions could be included in the code that catches the exception and causes the web page to be properly represented and/or populated with particular elements. As a result, if the behavior of the bot does not meet the expected behavior, the bot is hindered or outright barred from crawling the web page.

One challenge in utilizing user agent specific features to detect bots is that, as mentioned above, web services tend not to utilize such features in order to provide cross-compatibility for many different types of agents. As a result, according to some embodiments, an intermediary computer that physically or logically sits between the user agent and the web infrastructure intercepts messages and performs transformations to inject instructions that force the user agent to utilize one or more specific features in order to test the legitimacy of the agent. In an embodiment, the injection is performed by a component of the intermediary computer (referred to as a "transpiler") that parses instructions sent by the web infrastructure (such as JavaScript instructions) and rewrites those instructions to utilize the selected features.

For example, in some embodiments the transpiler (or another component) parses the instructions and generates an abstract syntax tree (AST), which is a graph where the constructs occurring in the source code are the nodes and the hierarchical relationships between the constructs are the edges. For instance, the statement "a+b" could be represented as an abstract syntax tree comprising a node representing the "+" operation and two child nodes representing the variables "a" and "b" respectively. The transpiler then performs transformations on the AST based on a predefined support matrix that converts the AST into a version that utilizes the selected features. For example, the "+" operator might be replaced with a call to an "Add( )" method implemented by the purported user agent, but not necessarily other types of user agents. Thus, an operation represented in the AST might be replaced with one or more other operations that utilize features specific to the purported user agent. In other cases, the AST might be modified to add new nodes/edges and/or remove nodes/edges without replacement. For example, the AST might be modified to pose a challenge to the user agent to perform a specific type of encoding on a randomized string. When the intermediary computer receives back the response, the randomized string can be decoded to determine if the encoding was performed correctly. In some embodiments, the AST is modified to utilize the selected features, but the end result of executing the instructions represented by the AST (such as a web page displayed to a user) is the same or substantially the same as the original instructions. However, other embodiments use a "reverse transformer" to transform the response from the user agent to a form expected by the web service to be the result of executing the original instructions.

Once the revised version of the AST is available, the transpiler traverses the revised AST to output a transformed set of instructions which is then sent to the user agent. If the user agent is legitimate, the user agent will be able to process the transformed set of instructions correctly. However, if the user agent is a bot, the bot might not be able to process the instructions and may crash, hang, or provide invalid responses, which can be intercepted, analyzed and/or blocked by the intermediary computer.

In addition to providing a means to identify bots by leveraging user agent specific features, in some embodiments the transpiler also performs optimizations on the instructions received from the web service that are tailored to the purported user agent. For example, the web infrastructure may utilize a first encoding because it is part of a baseline encoding library that is supported by a large number of user agents. However, the purported user agent may provide support for a second encoding that is faster and/or more space efficient. As a result, the intermediary computer, via the transpiler, may optimize the instructions by replacing the first encoding with the second encoding, providing legitimate user agents with more efficient instructions while simultaneously testing whether the user agent is legitimate. However, in other embodiments, the intermediary computer may utilize the transpiler solely for the purposes of optimization, rather than as part of a security measure to detect bots.

In an embodiment, a computer system comprises: one or more processors; a processor logic coupled to the one or more processors and configured to: intercept, from a client computer, a request directed to a server computer that identifies a purported user agent executing on the client computer; send, to the server computer, the request from the client computer, intercept, from the server computer, one or more original instructions to be executed by the purported user agent of the client computer; determine one or more features supported by the purported user agent that are not utilized by the one or more original instructions; transform the one or more original instructions into one or more revised instructions which, when executed by the purported user agent, cause the purported user agent to utilize the one or more features; send, to the client computer, the one or more revised instructions.

2.0 Browsers, Bots, and Attacks

In many cases, a web browser is a tool through which server-based application programs can provide client computers with content in a dynamic, custom user interface (UI). For example, in response to receiving a request for data from a web browser, a web server may respond with a set of instructions that define one or more objects with one or more object identifiers. The instructions may use the object identifiers to define how objects may be presented in a UI to enable human/computer interaction. For convenience of expression, a set of instructions may be referred to herein as a file and/or web page. A set of instructions, file, and/or web page need not have a particular type or extension, and need not be stored in persistent storage. For example, a web page may be generated dynamically based on one or more parameters. While some files may be identified as a particular type of file, such as an "HTML file" or "JavaScript file", a file may include mixed content. For example, an HTML file may include HTML, JavaScript, Cascading Style Sheets ("CSS"), and/or any other standard and/or proprietary set of instructions.

In contrast, bots traverse web pages and/or web sites to retrieve data from, and/or submit data to, one or more web servers with little, if any, human/computer interaction. For example, in response to receiving a request for data from a bot, a web server may respond with a set of instructions. A bot may parse the instructions to collect data from, and/or to store data in, particular objects with particular object identifiers. A bot may also make requests based on an object identifier, such as the identifier for a text field input. However, unlike a browser, a bot need not execute the instructions that define how objects should be presented in a UI because the bot is built to operate with little, if any, human/computer interaction. Thus, a bot may be a functionally-limited browser.

2.1 Example Browser Anatomy

FIG. 1 illustrates functional units of a web browser. Browser 100 may be a browser that is executed on a personal computer, used to communicate with or otherwise conceptually visit a web server, and operated by a user using the personal computer. Browser 100 is communicatively coupled with operating system ("OS") system application programming interface ("API") layer 150 and OS frontend API layer 160. Other embodiments may use other protocols, modules, and/or parsers.

Browser 100 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 120. Protocol module 102, DNS module 104, and local storage module 106 may send and/or receive data through OS System API layer 150. For example, protocol module 102 may send and/or receive data over any protocol, such as HTTP, to/from a server computer through OS system API layer 150. Data received through protocol module 102 may reference data sources by one or more domain names. DNS module 104 may resolve the one or more domain names referenced by interfacing with one or more remote domain name servers through OS system API layer 150. Local storage module may store and/or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate and/or update objects in a DOM maintained by DOM module 118.

Browser 100 may comprise sets of program logic implementing one or more programmable engines, such as extension execution environment 116 and JavaScript execution environment 120. Extensions may be written one or more programming languages include JavaScript, Python, Ruby, and/or any other language. Each programmable engine may have access to DOM module 118 and may operate on one or more objects from a DOM maintained by DOM module 118. For example, JavaScript execution environment 120 may execute JavaScript parsed by JavaScript parser 114 and in response, create, update, and/or delete one or more objects managed by DOM module 118, and/or one or more aspects of a UI presenting the one or more objects.

Browser 100 comprises rendering engine 122, interactivity module 124, and user interface 126. Each of the components may cause, through OS frontend API layer 160, one or more objects to be presented to a user using a client computer. Rendering engine 122 may determine how objects are presented to a user. For example, rendering engine 122 may determine the color, shape, orientation, position, and/or any other visual and/or audio attribute of an image, text field, button, and/or any other object defined by a set of received instructions. Furthermore, rendering engine 122 may cause a button to be displayed on a monitor coupled to a client computer through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to a client computer 299, the OS running on the client computer may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 and/or rendering engine 122 to update to update the UI accordingly.

2.2 Example Bot or "Headless Browser" Anatomy

A bot or "headless browser" may be a type of browser that includes a subset of the modules and/or features included in a browser used by a legitimate user, such as browser 100. For example, a bot may include protocol module 102, DNS module 104, local storage module 106, and HTML parser 112. A bot need not support a UI; thus, a bot need not include rendering engine 122, interactivity module 124, and user interface 126.

Less sophisticated bots need not include one or more parsers and/or execution environments. For example, a bot may be configured to look for data embedded in a DOM defined in one or more HTML documents. Therefore, the bet may include an HTML parser. However, the bet need not include one or more parsers or execution environments, such as image parser 108, CSS parser 110, JavaScript parser 114, extension execution environment 116, and/or JavaScript execution environment 120.

More sophisticated bots may include one or more parsers and/or execution environments. For example, a more sophisticated bot may include a JavaScript engine, such as JavaScript Execution Environment 120, which can be used to generate a run-time environment that executes JavaScript received from a web server.

3.0 Distinguishing Between Browsers Operated by Legitimate Users and Bots

A bot may be used for various attacks against a server computer. If a web server can determine whether a client computer is executing a bot or a browser used a legitimate user, then the web server can stop responding to the requests sent by the bot and continue to respond to requests from browsers being used by a legitimate user. Additionally or alternatively, a web server can perform countermeasures against the bet or the client computer(s) executing the bot. However, determining whether a client software application, running on a client computer, is a bot or a browser operated by a legitimate user can be difficult. For convenience of expression, a browser operated by a legitimate user may be a type of browser referred to herein as a legitimate or valid browser.

Some protocols, such as HTTP, allow for browsers and bots to identify themselves to the server. For example, a browser used by a legitimate user may include a header with an attribute called "user-agent" in a request for data sent to a server computer. The value associated the "user-agent" attribute may identify the type of browser or bot sending the request. In some embodiments, a web server can determine whether the value associated with the user-agent attribute is a legitimate browser or a bot, and respond accordingly. For example, a web server may respond to a request from a legitimate browser with the data requested, and ignore a request from a bot. However, a malicious bot may spoof its identity by using the same value for the "user-agent" attribute as a legitimate browser. Although "user agent" is in some cases described in reference to a browser, a "user agent" can in fact represent virtually any user driven program executing on the client computer.

3.1 Determining the Validity of a Browser

In some embodiments, a browser is determined to represent a legitimate user or a bot by exploiting features known to be implemented by the purported user agent, but might not be implemented or implemented differently by a bot.

For example, the web server or another element may store information, such as a support matrix, that specifies which features are supported or not supported by various types of user agents. The exact data structure used to implement the support matrix is not critical, but could take the form of a matrix where one index is the purported user agent, the second index is a feature, and each record is a Boolean value indicating whether the purported user agent supports the feature. Since in many protocols (such as HTTP) the requester specifies the purported user agent in a header, the purported user agent specified by the request can be compared to the support matrix to determine which features the browser should be able to support. One or more features that are known to be supported by the purported agent can then be selected for injection into the instructions (such as HTML, JavaScript, CSS, etc.) sent to the browser. If the browser is able to correctly utilize the injected feature(s), the browser is determined to be legitimate. However, if the browser is unable to utilize the injected feature(s), such as by returning an incorrect or no response, the browser is determined to be a bot.

3.2 Optimizing Based on a Browser

In other embodiments, in addition to or instead of determining validity of the browser, the purported user agent can also be used to optimize performance.

For example, upon analyzing the request to determine the purported user agent, a support matrix or other similar structure can be used to determine features supported by the purported user agent that would help improve performance. For example, by utilizing specific features of the purported user agent performance may be improved by reducing the length of the instructions embedded in the web page (JavaScript, CSS, HTML, etc.), using faster instructions native to the purported user agent over generic instructions, utilizing more efficient compression techniques available to the purported user agent, using better security protocols available to the purported user agent, and so forth.

However, in many cases, optimizing for performance will also have a side effect of hindering bots, even if the system is not specifically configured to detect bots. In order to take advantage of the optimizations, the browser needs to implement the features of the purported user agent that are being used to implement the optimizations. If the browser does not implement those features, then the bot may be unable to correctly process the received instructions in order to pull information from the web page or submit information to the web server.

3.3 Transpiler Overview

A transpiler, also known as a "source-to-source" compiler, is a type of computer program compiler that receives source code in one programming language as input and outputs source code in another programming language, or a revised version of the same programming language. Thus, while a traditional compiler generally translates from a higher level programming language (such as C++, Java, and so forth) to a lower level programming language or executable code format (such as assembly code, bytecode, and so forth), a transpiler converts between languages that are at roughly the same level. However, in other embodiments, a more general compiler can be used to implement the techniques described herein as opposed to a transpiler.

In some embodiments, a transpiler is used to rewrite the code included in a source web page to cause the code to utilize one or more feature for the purposes of optimization and/or security. For instance, the transpiler or another related component may parse the instructions into an abstract syntax tree (AST) that represents the source code in a data format that is capable of being manipulated. This AST then undergoes configurable transformations based on a support matrix, converting the AST into a form that represents a program that leverages features of the purported user agent. The transpiler then generates instructions by traversing the transformed AST and outputting instructions based on the nodes and edges encountered. However, an AST is not strictly required to implement the techniques herein. An AST is just one example structure that may be used to represent the rendering of the semantics to a syntactic structure. Thus, a program may be transformed at the syntactic level using an AST or at the semantic level using an ASG (abstract semantic graph). The instructions generated, in some embodiments, are a result of rendering another ASG (perhaps using different semantics and limited to a list) to an AST (e.g. op codes) and finally to a concrete syntax (e.g. a byte stream).

In some embodiments, the transformation that the transpiler performs on the AST is dependent on the features chosen to be injected into the instructions sent to the client. For example, the transpiler may store a mapping between features, structures within the AST, and transformations to perform on those structures. Thus, if the feature to inject involves forcing the client to utilize operation A as opposed to operation B, the transpiler may perform pattern matching on the AST to locate a structure representing operation A performed on one or more variables. This may take the form of a node representing operation A with child nodes representing the variables to be used with operation A. Then, upon locating the matching structure, the transpiler could perform a transformation, such as replacing the node representing operation A with a node representing operation B. However, in practice, the transformation can be far more complex than replacing a single node and may require adding nodes, replacing nodes, merging nodes, dividing out nodes, organizing the nodes in a different hierarchical structure, and so forth.

3.4 Example Features

The following are a number of example features that could be used to either detect bots, improve performance, or both. Which purpose or purposes the features are used for is dependent on the particular implementation of the techniques described herein. There is no requirement that an embodiment must implement any or all of the examples described below.

3.4.1 Syntax Example

In many cases as specifications evolve that define various programming languages, user agents begin to diverge in regard to which subsets of the language they implement. For example, ECMAScript is an evolving specification that directly influences how JavaScript is implemented in browsers and other environments. Since browsers may be updated to support the latest version of the specification at different rates, web services tend to provide web pages that use older syntax in order to support a wider range of agents. Thus, by catering the lowest common denominator, the web services are able to ensure maximum browser compatibility. As a result, many bets are implemented to only process this older and more baseline syntax since that will be the syntax encountered in the vast majority of cases. However, if the purported user agent is known to support a more modern version of the syntax, that knowledge can be exploited to test whether the browser is a bot or a legitimate user agent by modifying the source code to use that version of the syntax.

However, modifying the source code to use a different syntax has performance benefits in addition to security benefits. Changes in syntax are often brought about in order to allow more efficient code to be written. Thus, modifying the source code to utilize the newer syntax could result in reducing the size of the code transferred to and/or processed by the browser. Furthermore, if the source code is written to cater to a format that is not supported by the purported browser, rewriting the source code to use a format that is supported by the purported browser helps to ensure maximum browser compatibility. For example, the original source code may be written in a more modern format, whereas the purported user agent only supports the older format. Thus, by rewriting the source code to use the older format, the web service can be made compatible with the purported user agent even if the original source code is not explicitly compatible with that user agent.

For example, the original source code may appear as following:

```
const TEMP_VAR = "world"
let myString = 'Hello ${TEMP_VAR}'
```

For a browser that supports both template strings and let/const (e.g. Chrome version 42.0.2311.90), this source code could be passed without changes. However, for a browser supporting template strings, but not yet let/const (e.g. Firefox version 37.0.2), the source code could be transformed into the following:

```
var TEMP_VAR = "world"
var myString = 'Hello ${TEMP_VAR}'
```

However, for a browser that supports neither templated strings nor let/const (e.g. Safari version 8.0.5-10600.5.17), the source code could be transformed into the following:

```
var TEMP_VAR = "world"
var myString = "Hello " + TEMP_VAR.
```

3.4.2 Dependency Removal Example

If the original source can be determined to use a dependency (such as a particular code library written in JavaScript), the dependency could be exchanged in favor of native methods on browsers that support those native methods. For example, consider the following source code,

```
<html>
    <body>
        <p id=message></p>
        <script src='http://path.to/jquery.js'></script>
        <script>
            $('#message').html('Example setting the content of #message')
        </script>
    </body>
</html>
```

The above source code is dependent on jQuery, but for a browser that natively supports querying features using an instruction such as querySelectorAll, the source code could be transformed into the following:

```
<html>
    <body>
        <p id=message></p>
        <script>
            document.querySelector('#message').innerHTML =
    'Example setting the content of #message';
        </body>
</html>
```

Thus, the dependency on jQuery is removed in favor of a native method querySelector and the code to set the message has been inlined into the querySelector instruction. Since using native methods is often more efficient in terms of processing speed and code size, optimizing code to favor native methods can provide a performance benefit. Furthermore, in terms of security, a bot might not implement the native methods of the browser that the bot purports to be. As a result, rewriting the source code to utilize the native methods can also have the effect of testing whether the browser is a legitimate user agent or a bot.

3.4.3 Shim Example

In some cases, there are additional features that can be utilized to enhance security and/or performance that require more than just a syntax transformation and/or code replacement. For example, consider the following source code:

```
var myArray = [1,2,3,4];
var doubled = myArray.map(function(num){ return num * 2; });
```

For browsers that include a compliant Array.prototype.map( ) method, these instructions can be passed as is. However, for browsers that do not support or have an incomplete version of the method, this can be "shimmed" as necessary to inline the code that implements the method. For example, the source code may be transformed to the following:

```
Array.prototype.map||(Array.prototype.map=function(a,b){var
c,d,e;if(null==this)throw new TypeError("this is null or
undefined");var
f=Object(this),g=f.length>>>0;if("function"!==typeof a)throw new
TypeError(typeof a+" is not a
function");for(arguments.length>1&&(c=b),d=new
Array(g),e=0;g>e;){var h,i;e in
f&&(h=f[e],i=a.call(c,h,e,f),d[e]=i),e++}return d});
var myArray = [1,2,3,4];
var doubled = myArray.map(function(num){ return num * 2; });
``` which includes the original source code and additionally supplies an implementation for the Array.prototype.map( ) method. As a result, performance is enhanced by allowing the original source code to be supported by browsers that would not otherwise be able to execute the source code due to not having access to an implementation of the referenced method.

3.4.4 Enforcing Runtime Example

In some cases, it can be important to ensure that the code being sent to the browser is runnable only on a certain device or within a certain run-time environment. Thus, security can be enhanced by transforming the source code to utilize features that are only runnable on a particular device, user agent, or combination of both.

The following is an example of source code that brings up a window that presents the text "Hello World",

```
var myMessage = "Hello world";
alert(myMessage)
```

For browsers that implement try/catch in a way that allows the catch to close over the caught variable (such as Firefox version 42.0.2311.152) the code can be transformed into the following instructions which can break other browsers (such as Chrome version 32.0.2311.152 and Safari Version 8.0.5 106000.5.17),

```
try { throw 'Hello World' } catch (a) { function myFunc( ) {
return a } }
alert(myFunc( ));
```

For browsers that implement emerging technology under prefixes, the source code can be rewritten to take advantage of known properties that exist only in a certain type of browser, such as the following transformed source code,

```
var myMessage = "Hello world";
window.webkitMediaStream.constructor && alert(myMessage)
```

Thus, by rewriting the source code to use functionality that is unique to the purported browser, security can be improved by ensuring that the browser has accessed to those unique features. Furthermore, by selecting features which are known to cause other user agents to crash, there is an increased chance that the feature would not normally be seen in the practice, resulting in a decreased likelihood that a hot would implement that feature.

Figure 2:
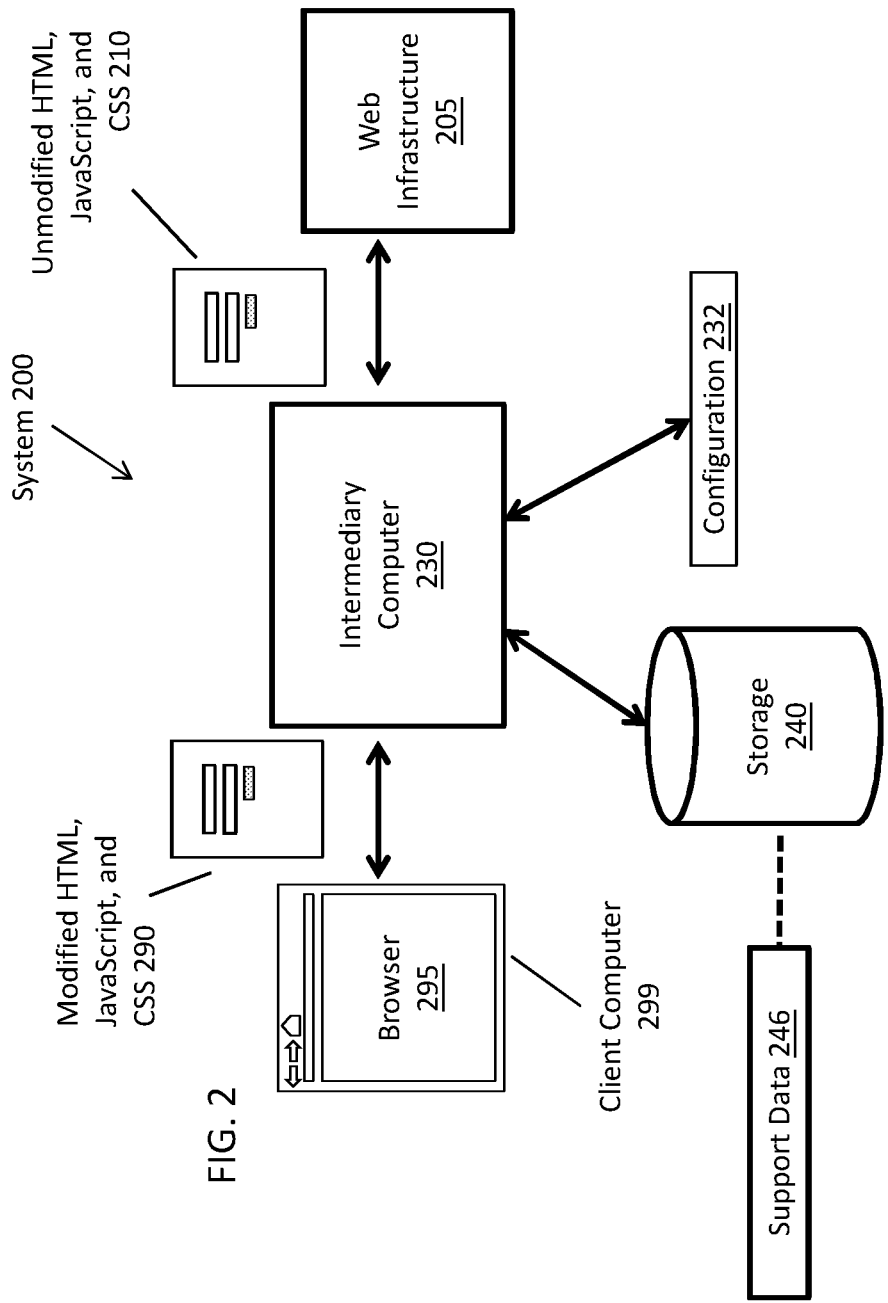
FIG. 2 illustrates a computer system comprising a browser, an intermediary computer, and a web infrastructure in an example embodiment.

4.0 Example Network Topology that Detects Whether a Browser is a Legitimate Browser or a Bot FIG. 2 illustrates a computer system comprising a browser, an intermediary computer, and a web infrastructure in an example embodiment. Referring first to FIG. 2, system 200 includes web infrastructure 205, client computer 299, intermediary computer 230, storage 240, configuration 232, and support data 246 distributed across a plurality of interconnected networks.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

While each of the components listed above is illustrated as if running on a separate, remote computer from each other, one or more of the components listed above may be part of and/or executed on the same computer. For example, intermediary computer 230, configuration 232, storage 240, web infrastructure 205, and/or support data 246 may be executed on the same computer, local area, and/or wide area network. Additionally or alternatively, intermediary computer 230 may be a proxy server and/or layer for web infrastructure 205. Additionally or alternatively, intermediary computer 230 may be in line between a router and web infrastructure 205, such that intermediary computer 230 may intercept all network data sent to, and/or sent from, web infrastructure 205 over one or more protocols. Additionally or alternatively, intermediary computer 230, and/or one or more modules comprising intermediary computer 230 discussed herein, may be a software layer between, and/or executed on, web infrastructure 205 and/or a component of web infrastructure 205. Additionally or alternatively, intermediary computer 230, and/or one or more modules comprising intermediary computer 230 discussed herein, may be part of a server-side application that responds to requests over one or more standard and/or proprietary protocols, such as HTTP and/or any other protocol. Additionally or alternatively, the support data 246 may be stored locally by the intermediary computer 230 as opposed to being stored in storage 240.

4.1 Web Infrastructure

Web infrastructure 205 may comprise one or more server computers that receive requests for data from users through one or more computers, such as client computer 299 and/or intermediary computer 230. Web infrastructure 205 may respond by sending data to the browser that sent the request. As illustrated in FIG. 2, the data sent from web infrastructure 205 may include instructions such as HTML, JavaScript, and CSS 210. The one or more computers in web infrastructure 205 may, but need not, be owned and/or managed by one or more independent entities and may span across one or more computer networks.

A server computer may be a computer that receives requests for data and responds with data. For example, a web server computer may be an HTTP-based computer that receives HTTP requests and responds with data comprising HTML, CSS, and/or JavaScript instructions. Additionally or alternatively, a server computer may respond with data that references data on other server computers in, and/or outside of, web infrastructure 205.

4.2 Intermediary Computer

Intermediary computer 230 may be an intermediary that may intercept instructions sent from web infrastructure 205, parse and/or execute one or more of the intercepted instructions, modify the intercepted instructions, generate and/or add new instructions, and send the modified and/or new instructions to a client computer. For example, intermediary computer 230 may intercept HTML, JavaScript, and CSS 210, generate modified HTML, JavaScript, and CSS 290, and send modified HTML, JavaScript, and CSS 290 to browser 295. Intermediary computer 230 may intercept a request from browser 295, generate a new and/or modified request, and send the new and/or modified request to web infrastructure 205.

Intermediary computer 230 may be an HTTP or SPDY intermediary that intercepts, parses, executes, and/or processes HTML, JavaScript, and CSS instructions. Additionally or alternatively, intermediary computer 230 may intercept requests for data and/or instructions from a client application, generate a new HTTP request, and send the newly generated HTTP request to one or more HTTP and/or SPDY-based web servers. Additionally or alternatively, intermediary computer 230 may be an intermediary for any other standard and/or proprietary protocol. Furthermore, each of the components discussed herein, which intermediary computer 230 is comprised of, may be configured to perform any of the processes and/or methods discussed herein for any standard and/or proprietary protocol.

Intermediary computer 230 may be a server computer that one or more domain name servers or other elements of the domain name system ("DNS") identify in DNS records as a destination network address associated with one or more internet domain names. Accordingly, intermediary computer 230 and/or intermediary computer 230 may receive requests sent to the one or more domains from a browser or bot. Based on using DNS to resolve the domain name in a request to a network address, intermediary computer 230 may forward the request, or a modified request, to a server computer in web infrastructure 205, such as an original web server computer.

In FIG. 2, intermediary computer 230 is programmed to send instructions to, and receive requests from, a particular type of client application: browser 295. However, in an embodiment, intermediary computer 230 may be programmed to send instructions to, receive requests from, and/or open sockets with browsers and/or bots. In an embodiment, the intermediary computer 103 may be programmed to send instruction to, receive requests from, and/or open sockets with virtually any type of user agent.

Figure 3:
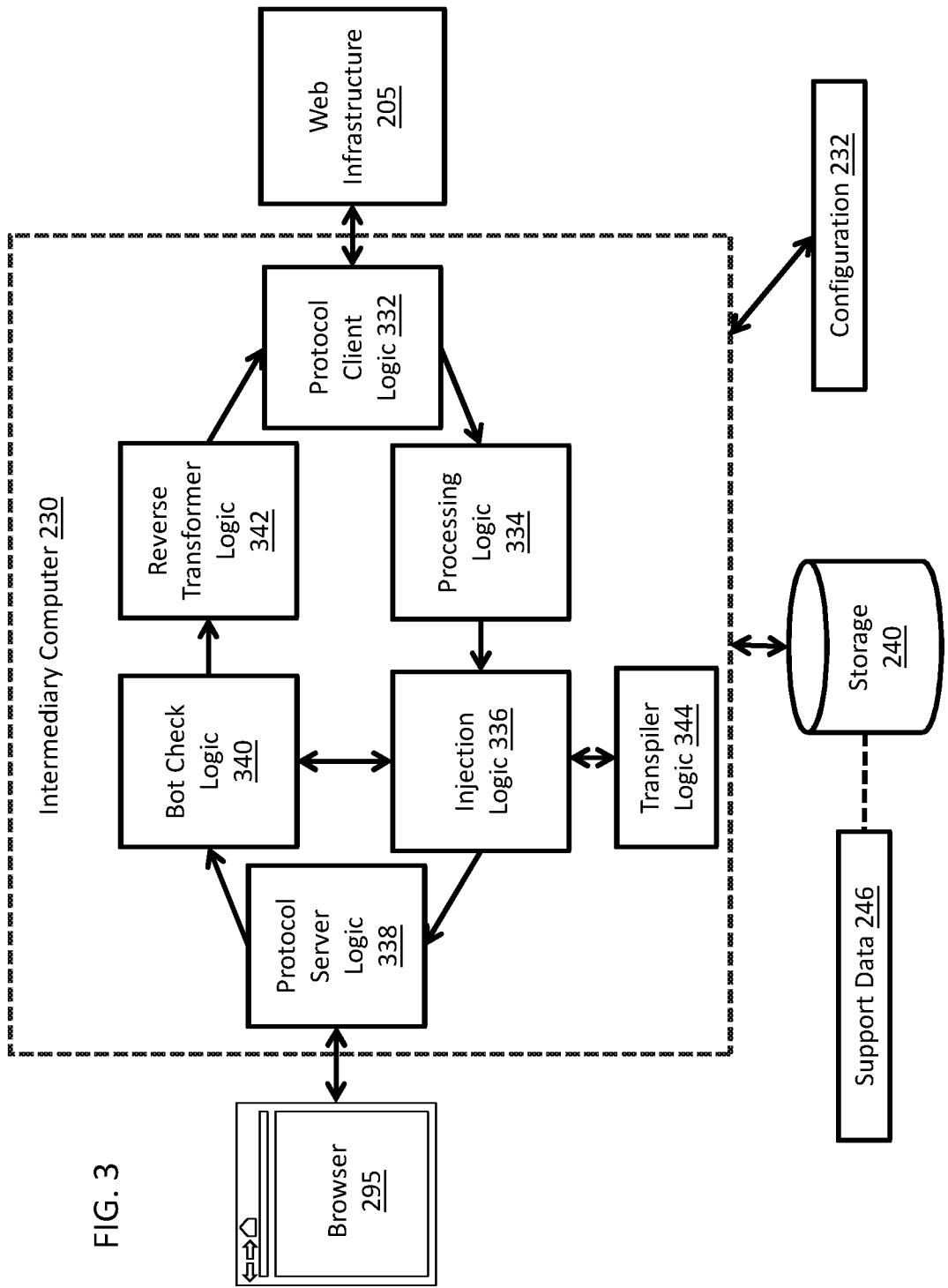
FIG. 3 illustrates a detailed view of an intermediary computer in an example embodiment.

FIG. 3 illustrates a detailed view of an intermediary computer in an example embodiment. In FIG. 3, intermediary computer 230 comprises protocol client logic 332, processing logic 334, injection logic 336, protocol server logic 338, bot check logic 340, reverse transformer logic 342, and transpiler logic 344. In an embodiment, each of the functional units of intermediary computer 230 may be implemented using any of the techniques further described herein in connection with FIG. 6; for example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other.

4.2.1 Protocol Client Logic

Protocol client logic 332 may intercept data over any standard or proprietary protocol. For example, protocol client logic 332 may intercept data over HTTP.

In some embodiments, protocol client logic 332 is configured to send requests to the web infrastructure 205 on behalf of the browser 295 and receive instructions from the web infrastructure 205 in return. For example, the protocol client logic 332 might take requests from the browser 295 and append one or more network and/or transport layer protocol headers that make the request appear to come from the intermediary computer 230. As a result, when the web infrastructure 205 receives and processes the request, the instructions are sent to the intermediary computer 230 instead of directly to the browser 295. Thus, in some embodiments, the protocol client logic 332 acts as a proxy for the browser 295 when interfacing with the web infrastructure 205. However, in other embodiments, the intermediary computer 230 might be set up to physically sit between the browser 295 and the web infrastructure 205 or as a hop along a network path between the browser 295 and the web infrastructure 205. In such cases, protocol client logic 332 might forward the request without modifications since the response from the web infrastructure 205 will be guaranteed to arrive back at the intermediary computer 230. In some cases, requests sent by the browser 295 may be transformed by the reverse transformer logic 342 before being passed into the protocol client logic 332 for transmission to the web infrastructure 205.

4.2.2 Processing Logic

Processing logic 334 may process instructions intercepted by protocol client logic 332, which may cause processing logic 334 to process, parse, and/or execute instructions and/or content received by protocol client logic 332. Accordingly, processing logic 334 may generate one or more data structures in memory. Processing one or more instructions may comprise parsing and/or executing the one or more instructions. After processing the instructions, processing logic 334 may notify injection logic 336 to begin generating instructions based on the one or more data structures created by processing logic 334 that are currently in memory. In some embodiments, the one or more data structures in memory represent a Document Object Model (DOM) and/or one or more ASTs representing the structure of the instructions received from the web infrastructure 205. However, in other embodiments, the work of parsing and generating the data structures in memory is shared among multiple components. For example, the transpiler logic 344 may generate ASTs and the processing logic 334 may generate DOMs.

Processing logic 334 may make requests for additional data. For example, if instructions received from protocol client logic 332 reference additional instructions stored on another or the same web server, then processing logic 334 may request the additional instructions through protocol client logic 332.

4.2.3 Injection Logic

Injection logic 336 may receive instructions from the web infrastructure 205 via the processing logic 334 and modify the instructions (such as via the transpiler logic 344) to cause the browser to perform one or more operations. For example, the injection logic 336 may modify instructions or add additional instructions which force the browser to utilize one or more features that will be used to determine whether the browser is a legitimate user agent or a bot, and/or implement one or more performance optimizations. In some embodiments, the instructions cause the browser 295 to send results of executing the one or more operations back to intermediary computer 230 for analysis by the bot check logic 340. However, in cases where the browser is actually a bot, the one or more instructions may elicit no response since the attempt to utilize features that the bot does not actually implement may cause the bot to stall, crash, or be unable to meaningfully respond. However, in other embodiments, the injected features are used for performance optimization rather than to enhance security, and thus the injection logic 336 may not inject features which cause the browser 295 to send back additional data for analysis by bot check logic 340.

In some embodiments, the injection logic 336 determines which features to inject based on the support data 346 stored in storage 240. For example, the support data 346 may represent a support matrix that indicates which user agents are capable of supporting which features. When the protocol server logic 338 receives the initial request from the browser 295, the protocol server logic 338 may store session information that identifies the browser 295, such as by IP address, port address, purported user agent, time request was received, and so forth. The aforementioned information may be obtained from header information sent along with the request, such headers from application layer messages, network layer packets, an internal clock mechanism of the intermediary computer 230, and so forth. The purported user agent, along with the support data 346 allows the injection logic 336 to determine which features will be injected into the instructions received from the web infrastructure 205. For example, the injection logic 336 can determine from the support data 346 and the purported user types a list of features which are known to be supported by that user type. The injection logic 336 then selects one or more features from the list to inject into the instructions.

There are a myriad of techniques that the injection logic 336 can use to select which supported features to inject. In one embodiment, the injection logic 336 comprises a set of rules for each type of purported user agent that specifies the exact feature(s) to inject into the instructions. In another embodiment, the injection logic 336 scans the in memory structures generated by the processing logic to determine one or more features that the instructions utilize which have corresponding features which are unique or native to the purported browser type. The injection logic 336 can then choose to inject those corresponding features, such as switching out one encoding technique for another or using a native method instead of a non-native method. In yet other embodiments, the injection logic 336 scans the in memory structures to determine whether the instructions already utilize one or more of the supported features of the purported user agent and selects other features which are not already included. In yet another embodiment, the injection logic 336 may choose supported features at random. The injection logic 336 can also use combinations of the aforementioned techniques.

In some embodiments, the injection logic 336 may choose to include features which are not known to be supported by the purported user agent, but which are not likely to cause any significant harm to the user agent if it is actually legitimate. For example, the injection logic 336 may randomly choose to include a test that uses a feature known not to be supported by the purported user agent and/or randomize which non-supported feature will be tested. As a result, a bot mimicking a legitimate user would have a difficult time trying to determine the exact feature tests that will be injected and therefore would have a more difficult time mimicking how a legitimate user agent would respond even if a large sample of injected features were to be collected. Furthermore, correct responses to injected features that the legitimate user agent would ordinarily be unable to process could also be used as an indication that the user agent is actually a bot.

In some embodiments, the injection logic 336 injects instructions which utilize supported features into the instructions received from the web infrastructure 205 by means of transpiler logic 344. Thus, the transpiler logic 344 may be configured to perform transformations on the instructions received from the web infrastructure 205 to generate a revised set of instructions to be sent to the browser 295. However, in some embodiments, the transpiler logic 344 may be specialized for particular types of instructions, such as JavaScript instructions. Thus, some embodiments may include multiple transpilers, each of which is configured to perform transformations on a particular type of instructions, such as JavaScript, CSS, HTML, and so forth.

In some embodiments, injection logic 336 sends and/or stores data in bot check logic 340 and/or storage 240 indicating which features were injected into the instructions sent to each browser and/or client computer. In some cases, the injection logic 336 may also store the correct response or responses that the browser 295 should return in order to successfully pass the test.

In some embodiments, injection logic 336 operates on objects and/or renders instructions based on one or more configurations specified in configuration 232. For example, configuration 232 may indicate a set of client computers and/or browsers for which the intermediary computer 230 should not inject instructions. These might be clients/browsers which are known to be trusted and may be set by an administrator of the intermediary computer 230.

In an embodiment, when injection logic 336 has finished injecting the instructions which utilize the user-agent supported features, the injection logic 336 sends the transformed instructions to the protocol server logic 338 for transmission to the browser 295.

4.2.4 Transpiler Logic

In an embodiment, transpiler logic 344 is configured to receive instructions and/or an in memory representation of the instructions, such as an AST, and perform transformations on the in-memory representation to generate instructions which utilize one or more features of the purported user agent. In embodiments where the in-memory representation is generated by another component, such as the processing logic 334, the transpiler logic 344 can use the pre-generated representation to perform the transformation. However, in other embodiments, the injection logic 336 passes the raw instructions to the transpiler logic 344, which then parses those instructions into an in-memory representation.

In some embodiments, the in-memory representation generated by the transpiler logic 344 is an AST, where the nodes of the AST represent constructs found in the instructions and the edges represent the hierarchical relationships of those constructs. The transpiler logic 344 then transforms the AST by applying one or more transformations based on the features selected by the injection logic 336. The one or more transformations convert the AST so that the instructions represented by the AST represent a program that leverages the selected features of the purported browser. The transpiler logic 344 then generates a revised set of instructions by traversing the transformed AST and outputting instructions based on the nodes and edges encountered during the traversal. To provide clear examples, the remainder of this section will assume the in-memory representation is an AST, but that structure is not required to perform the techniques described herein. Example transformations that could be performed by the transpiler logic 344 are described above in Sections 3.4.1-3.4.4.

In some embodiments, the transformation that the transpiler logic 344 performs on the AST is dependent on the features chosen to be injected into the instructions sent to the client. For example, the transpiler may store a mapping between features, structures within the AST, and transformations to perform on those structures. Thus, if the feature to inject involves forcing the client to utilize operation A as opposed to operation B, the transpiler may perform pattern matching on the AST to locate a structure representing operation A performed on one or more variables. This may take the form of a node representing operation A with child nodes representing the variables to be used with operation A. Then, upon locating the matching structure, the transpiler could perform a transformation, such as replacing the node representing operation A with a node representing operation B. However, in practice, the transformation can be far more complex than replacing a single node and may require adding nodes, replacing nodes, merging nodes, dividing out nodes, organizing the nodes in a different hierarchical structure, and so forth. Although an AST is used as an example above, the techniques described herein are not limited to representing a program with an AST. In other embodiments, as described above, an ASG may be used or a combinations of ASTs and ASGs.

4.2.5 Protocol Server Logic

Protocol server logic 338 may receive the instructions generated by injection logic 336 and send the generated instructions to client computer 299. Additionally or alternatively, protocol server logic 338 may intercept requests from client computer 299 and forward the requests to bot check logic 340.

In some embodiments, the protocol server logic 338 is configured to intercept the initial request from the browser 295 to the web infrastructure 205 and record one or more data structures in memory that tracks the current session, such as the purported user agent, IP address, port number, time when the request was received and so forth for access by other components of the intermediary computer 230. For example, the aforementioned information might be pulled from a header of a request sent by the browser 295, such as an HTTP header. In some cases, the protocol server logic 338 might utilize headers belonging to multiple layers of the OSI networking model, such as pulling the purported user agent from an application layer HTTP header and pulling the IP address from a network layer packet header. Once recorded, the session information becomes available for access by other components of the intermediary computer 230. For example, the injection logic 336 could use the purported user agent to determine which features to inject to test the validity of the browser 295. The session information may be recorded in storage 240 or stored in local memory of the intermediary computer 230.

In some embodiments, for the initial request, the protocol server logic 338 records the session information and bypasses the bot check logic 340 and/or reverse transformer logic 342. Thus, in such embodiments, the request is passed directly to the protocol client logic 332 for transmission to the web infrastructure 205. For example, in cases where the initial request is received from the browser 295 without any manipulation by the intermediary computer 230, there might not be enough information at that time to make checking whether the browser 295 is a bot worthwhile. Furthermore, since the request was not a result of a transformation by the intermediary computer 230, there might not be a need to utilize the reverse transformer logic 342. However, in other embodiments, the initial request is still sent to the bot check logic 340 and/or the reverse transformer logic 342 even for the initial request. For example, the bot check logic 340 might still be able to perform a base set of checks to determine whether the browser 295 is a bot just from the information contained in the initial request. In addition, the reverse transformer logic 342 could still be useful if the browser 295 makes a request that is not in a format compatible with the web infrastructure 205. In such cases, the reverse transformer logic 342 might utilize the transpiler logic 344 or another component to transform the request into a valid format that the web infrastructure 205 can process.

4.2.6 Bot Check Logic

Bot check logic 340 may receive the results from one or more instructions that were injected by the injection logic 336 and determine whether the browser 295 that sent the results is a legitimate user agent or a bot. Additionally or alternatively, if bot check logic 340 does not receive data indicating that the browser 295 executed the particular browser detection test correctly (for example, by timing out without receiving a response, receiving an invalid response, and so forth), then bot check logic 340 may determine that the browser is a bot.

Bot check logic 340 may send data to injection logic 336, and/or store data in storage 240, indicating whether a browser 295 represents a legitimate user agent or a bot. Accordingly, if injection logic 336 receives data from bot check logic 340 and/or storage 240, indicating that a particular browser on a client computer is a legitimate browser, then injection logic 336 might inject fewer, and/or less aggressive, tests in web pages sent to the particular browser. If injection logic 336 receives data from bot check logic 340, and/or storage 240, indicating that a particular browser on a client computer is a bot, then injection logic 336 inject more, and/or more aggressive, tests in web pages sent to the particular browser. Alternatively, the protocol server logic 338 might be configured to receive data from bat check logic 340 and/or storage 240 and filter/block communications from that particular browser, for example based on an Internet Protocol (IP) address of the browser or other means of identification.

The instructions that cause the browser 295 to utilize the features selected by the injection logic 336 may be configured to cause the browser 295 to send one or more results of executing those instructions along with a request for additional data, and/or separately and/or asynchronously with request from the browser for additional data.

4.2.7 Reverse Logic

Reverse logic 342 may translate requests intercepted by protocol server logic 338, which are based on instructions generated by injection logic 336, into requests that would have been generated by browser 295 had browser 295 received the original instructions sent from web infrastructure 205. For example, if a request from browser 295 includes a dynamic credential generated by bot check logic 340, then reverse transformer logic 342 may generate a new request that does not include the dynamic credential. Reverse logic 342 may send the new request web infrastructure 205 through protocol client logic 332 on behalf of browser 295. In some cases, the protocol server logic 338 might utilize the transpiler logic 344, or a different type of compiler that converts the requests to use a different format. For example, the browser 295 might send responses using an outdated syntax that the web infrastructure 205 is not configured to process. As a result, the reverse transformer logic 342 might use the transpiler logic 344 to remove features from the response, such as replacing the outdated syntax with a more recent version that can be processed by the web infrastructure 205.

4.2.8 Configurations

The support data 232 may be a database, a configuration file, and/or any other structure that stores configurations: settings, preferences, and/or protocols. Support data 232 may store more than one configuration for one or more web servers in web infrastructure 205. For example, configuration 232 may include data that indicates data and/or web pages from one or more server computers in web infrastructure 205 need not be injected with user agent specific features and/or instructions.

Configuration 232 may be modified by a user and/or administrator through one or more computers, such as intermediary computer 230, a computer in web infrastructure 205, and/or any other computer. The one or more computers may present the user with an interface that presents a site map. The site map may comprise a graph, wherein the nodes correspond to pages and the edges between the nodes correspond to links. The administrator may then select nodes within the graph and optionally flag those nodes, such as through a corresponding button or other widget, as not need not be injected with user agent specific features and/or instructions. In some embodiments, the administrator may specify the web pages that should not be injected with user agent specific features and/or instructions by entering the uniform resource locator (URL) of the web pages to exclude.

The user may update configuration 232, through the interface, by selecting which links and/or pages to be "public" (need not have instructions that perform to detect whether the browser is a bot) and which links and/or pages are "private" (may have instructions that detect whether the browser is a bot). For example, the interface may receive input from a user indicating that a page is public and the configuration 232 is updated accordingly. In some embodiments, even if a page is marked as "private" the intermediary computer 230 may still inject code to utilize features specific to the purported user agent of the browser 295 for the purpose of implementing optimizations. However, the intermediary computer 230 may skip injecting features whose sole purpose is improving security and/or bypass the bot check logic 340 on receiving a request for the web page from the browser 295.

4.2.9 Storage

Storage 240 may store one or more expected results from one or more browsers, which may be used by intermediary computer 230, and/or bot check logic 340. In some embodiments, storage 240 stores support data 246 that is used by the injection logic 336 to determine which features to inject. Storage 240 may be a database, a configuration file, and/or any other system and/or data structure that stores data. In FIG. 2, storage 240 is illustrated as if a separate computer from intermediary computer 230. Additionally or alternatively, storage 240 may be a data structure stored in memory on the one or more computers comprising intermediary computer 230. Additionally or alternatively, storage 240 may, at least in part, be a data structure stored in shared memory between one or more intermediary computers. Additionally or alternatively, data stored within storage 240 may, at least in part, be stored in volatile and/or non-volatile memory.

4.3 Browser

Browser 295 may be a browser as described herein and executed on a client computer, such as client computer 299. Additionally or alternatively, browser 295 may be a bot comprising one or more of the components of a browser illustrated in FIG. 1.

5.0 Process Overview

Figure 4:
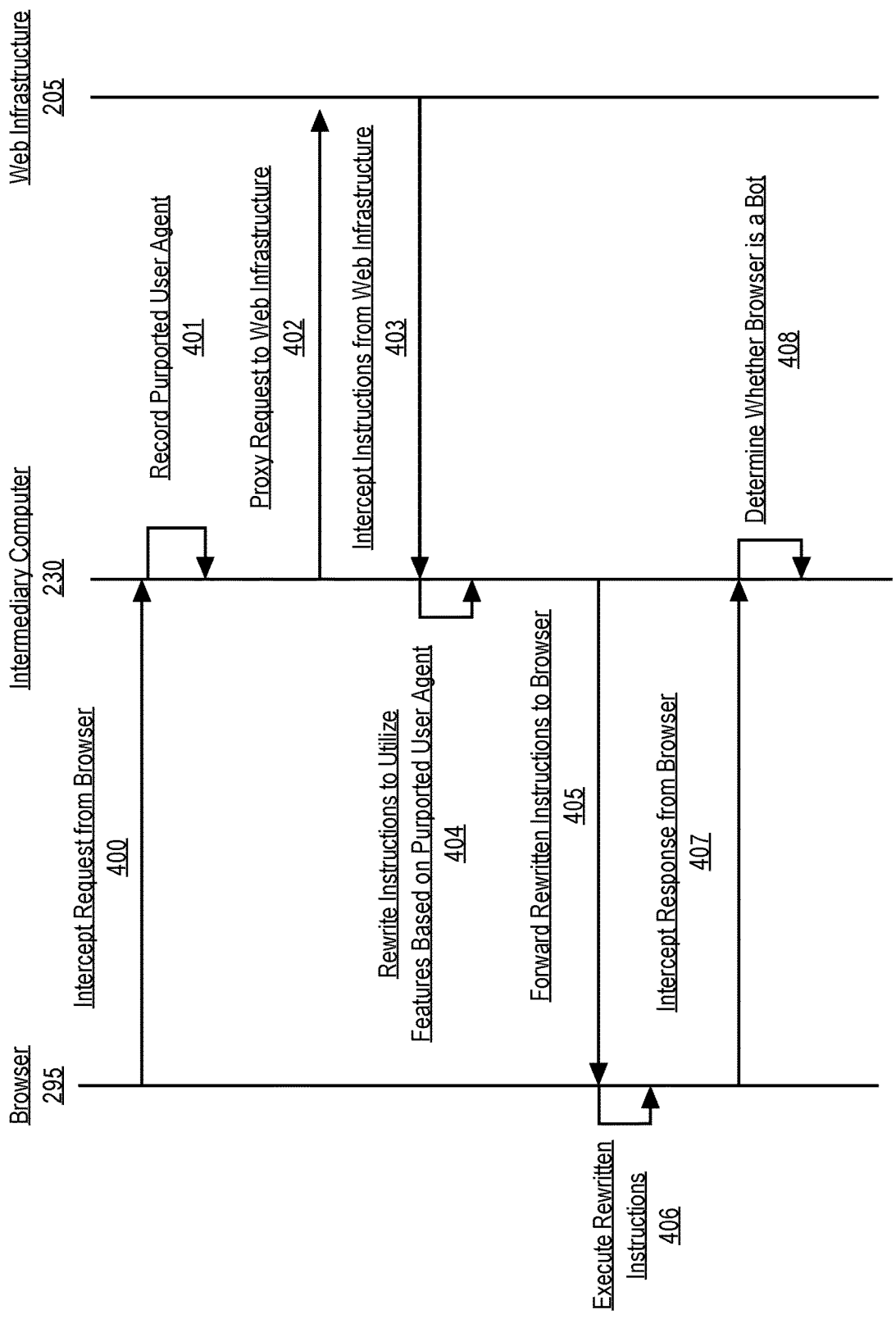
FIG. 4 illustrates an overview of a process for determining whether a browser represents a legitimate user agent or a bot according to an embodiment.

FIG. 4 illustrates an example overview of a process for detecting whether a browser is a legitimate user agent or a bot according to an embodiment. As discussed above, other embodiments may utilize the intermediary computer 230 solely for the purpose of implementing optimizations by transpiling the instructions received from the web infrastructure 205 before transmission to the browser 295. However, in order to provide a clear example, FIG. 4 illustrates the case where the intermediary computer 230 is used to provide enhanced security in addition to or instead of implementing optimizations.

In FIG. 4, at step 400, the browser 295 sends a request to the web infrastructure 205 that is intercepted by the intermediary computer 230. For example, the request may be an HTTP request for a web page managed by the web infrastructure 205. At step 401, the intermediary computer 230 records the purported user agent of the browser 295. For example, the intermediary computer 230 may inspect the header of the HTTP request and record the purported user agent listed as a field within the header. At step 402, the intermediary computer 230 proxies the request to the web infrastructure 205. For example, the intermediary computer 230 may encapsulate the request in a network packet that specifies the request as coming from the intermediary computer 230 to ensure replies from the web infrastructure 205 are intercepted by the intermediary computer 230. At step 403, the intermediary computer 230 intercepts a set of instructions from the web infrastructure 403. For example, the set of instructions could be JavaScript, CSS, or HTML instructions representing the requested web page. At step 404, the intermediary computer 230 rewrites the set of instructions to utilize one or more selected features based on the purported user agent of the browser 295. At step 405, the rewritten instructions are forwarded to the browser 405, who executes the instructions at step 406. At step 407, the intermediary computer 230 intercepts a response and/or a new request from the browser 295. At step 408, the intermediary computer 230 inspects the response and/or new request to determine whether the browser 295 is a bot.

As discussed above, if the browser 295 is determined to be a bot, the intermediary computer 230 might block communications from the browser 295 or perform another type of countermeasure. However, if the browser 295 is determined not to be a bot, the response may be rewritten to remove all traces of the transformation performed at step 404 and forwarded to the web infrastructure 205.

5.1 Intercepting Instructions from a Content Server Computer

Figure 5:
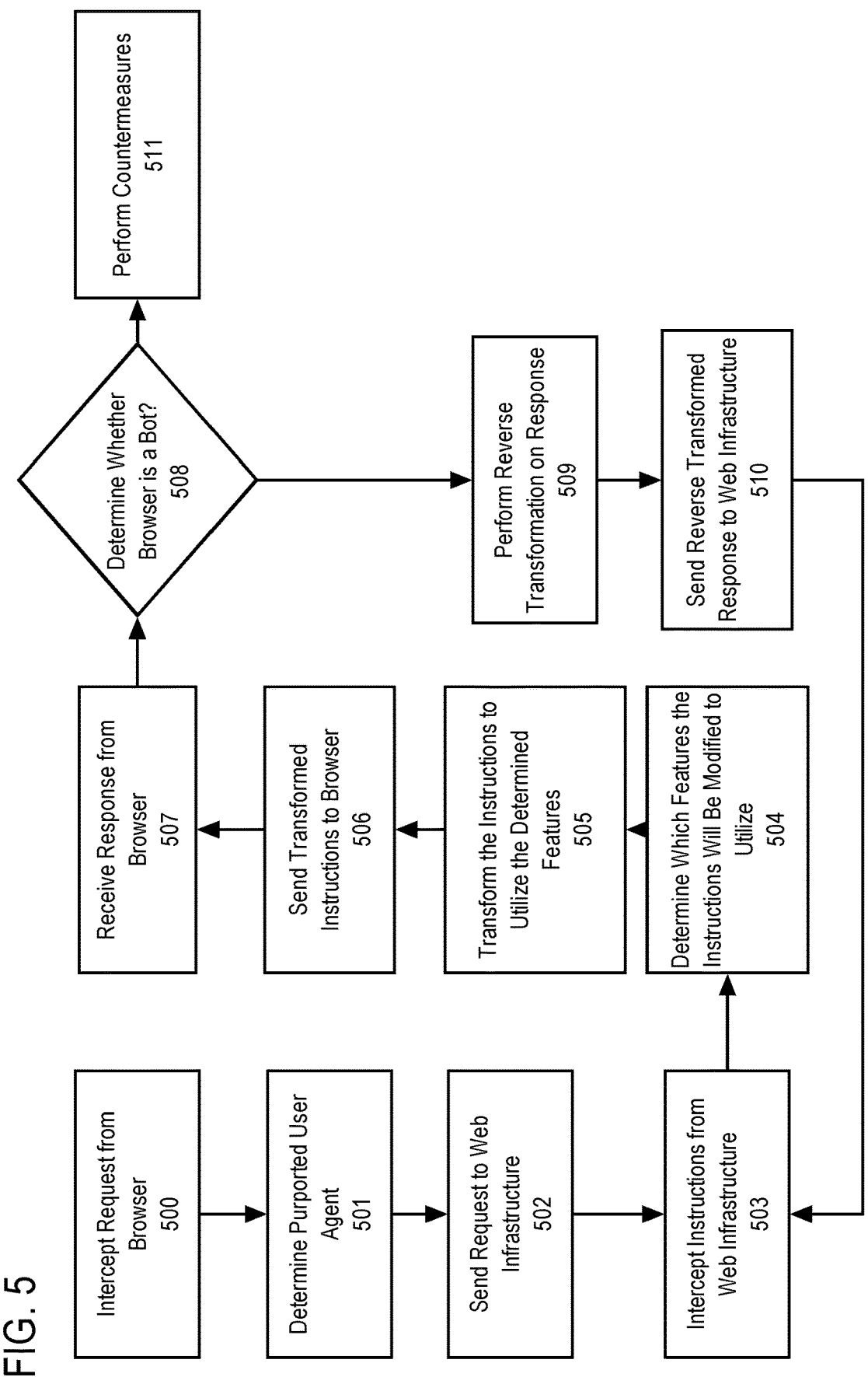
FIG. 5 illustrates a process for determining whether a browser represents a legitimate user agent or a bot in block diagram form according to an embodiment.

FIG. 5 illustrates a process for determining whether a browser is a legitimate or a bot in block diagram form according to an example embodiment. In order to provide clear examples, the process illustrated in FIG. 5 will be explained in relation to the browser 295, intermediary computer 230, and web infrastructure 205. However, the techniques described herein are not limited to the exact components of system 200. Furthermore, the steps described in relation to FIG. 5 do not necessarily need to be performed in the same order as presented below. In other embodiments, the steps can be performed in a different order, steps may be combined, steps may be added/deleted, steps may be divided out into multiple steps, and so forth.

At block 500, the intermediary computer 230 intercepts a request from the browser 295 for content managed by the web infrastructure 205. For example, the browser 295 might send an HTTP request for a web page hosted by the web infrastructure 205 which is intercepted by the intermediary computer 230. In an embodiment, the intermediary computer 230 intercepts the request by being physically located between the browser 295 and the web infrastructure 205, such as a gateway device to a local network containing the web infrastructure 205. However, in other embodiments, intermediary computer 230 may be logically situated between the browser 295 and the web infrastructure 205. For example, the intermediary computer may be a server computer that one or more domain name servers identify in DNS records as a destination network address associated with one or more internet domain names, such as the domain name of the site hosted by the web infrastructure 205. Accordingly, intermediary computer 230 may receive requests sent to the one or more domains from the browser 295 based on using DNS to resolve the domain name in the request to a network address of the intermediary computer 230.

At block 501, the intermediary computer 230 determines the purported user agent of the browser 295. For example, the intermediary computer 230 or a component thereof may inspect an HTTP header contained in the request for a field that identifies the purported user agent. The intermediary computer 230 then stores session information for the current session with the browser 295, such as IP address, port number, purported user agent, time request was received, and so forth in storage 240 or in local memory for later access.

At block 502, the intermediary computer 230 sends the request to the web infrastructure 205. In some embodiments, the intermediary computer 230 forwards the request to the web infrastructure 205 without making any changes to the request. However, in other embodiments, the intermediary computer 230 may modify the request to make the request appear to come from the intermediary computer 230. For example, if the intermediary computer 230 is configured as a gateway device which packets must pass through in order to reach the web infrastructure 205, the intermediary computer 230 might not need to modify the request to ensure the response from the web infrastructure 205 is intercepted. However, if the intermediary computer 230 is logically configured to sit between the browser 295 and the web infrastructure 205, such as through the manipulation of DNS records, the intermediary computer 230 may encapsulate the request with a network layer header identifying the IP address of the intermediary computer 230 to ensure responses from the web infrastructure 205 are received at the intermediary computer 230 rather than the browser 295.

At block 503, the intermediary computer 230 intercepts, from the web infrastructure 205, content, such as a web page, with a set of instructions that define one or more objects and/or operations, to be processed, parsed, and/or executed by the browser 295. For example, the web page may comprise HTML, CSS, JavaScript, and/or any other type of instructions.

5.2 Injecting Features

At block 504, the intermediary computer 230 determines one or more features that the instructions will be modified to utilize. In an embodiment, the intermediary computer 230 accesses support data 246 that indicates which features are supported by which user agents. For example, the support data 246 may represent a support matrix where the first index represents features, the second index represents user agents, and each entry is a Boolean value that indicates whether the user agent supports the feature. Once the intermediary computer 230 identifies the supported features, the intermediary computer 230 performs a selection on the supported features to determine which features will be injected into the instructions. In an embodiment, the intermediary computer 230 may access configurations 232 that indicate set features to inject for each purported type of user agent. However, in another embodiment, the intermediary computer 230 may analyze the instructions received at block 503 and select features based on the type of instructions encountered. Thus, if the instructions received at block 503 utilize features which have a corresponding feature that is more specific to the purported user agent, the intermediary computer 230 could select the more specific feature for injection/replacement. For example, the intermediary computer 230 may seek to replace non-native methods with native methods that perform substantially the same function or replace one instance of syntax that is generically compatible with many user agents with another instance specifically known to be supported by the purported user agent. In another embodiment, the intermediary computer 230 randomly determines the one or more features that the instructions will be modified to utilize from the set of features supported by the purported user agent. In some embodiments, the intermediary computer, in addition to determining the one or more features, also stores data in storage 240 identifying which features were injected and/or (in the case of features injected for security reasons) what the proper response should be from the browser 295.

At block 505, the intermediary computer 230 transforms the instructions received at block 503 to include instructions which utilize the selected features when executed by the browser 295. For purposes of illustrating a clear example, assume that the web page received in the previous step comprises HTML, CSS, and JavaScript instructions. Processing logic 334 may parse the instructions and construct an in-memory representation of the instructions, such as an in-memory DOM and/or one or more ASTs. Transpiler logic 344 then traverses the in-memory representation to identify specific structures and modify those structures to represent instructions which utilize the selected features. For example, the transpiler logic 344 may utilize a configuration 232 that specifies a specific feature, a pattern indicating a structure to modify, and the transformation(s) to perform on the structure. The pattern may indicate structures, such as a node representing a particular instruction and other nodes representing arguments passed into those instructions. There is no limit to the type of structures within the in-memory representation that the intermediary computer 230 can search for to perform the transformations. However, in some cases, the modification may only add or remove nodes from the in-memory representation without modifying or replacing existing nodes. Once the in-memory representation has been modified, the transpiler logic 344 traverses the structure and outputs a transformed set of instructions which when executed will cause the browser 295 to utilize the selected features.

At block 506, the intermediary computer 230 sends the transformed set of instructions to the browser 295. For example, injection logic 336 may send the web page and/or the injected instructions in step 420 to browser 295 through protocol server logic 338.

5.3 Determining Whether a Browser is Legitimate and/or a Bot

At block 507, the intermediary computer 230 receives a response from the browser 295. Depending on the embodiment, the response may include an additional request for content, such as a new web page, and/or additional data generated as a result of executing the transformed instructions. For example, the injected features may include code which when executed causes the browser 295 to perform a specific type of encoding on a string or other type of data that should be returned in the response. The new request may be transported synchronously or asynchronously with the additional data, in the case that the browser 295 returns both.

At block 508, the intermediary computer 230 determines whether the browser 295 represents a legitimate user or a bot. Additionally or alternatively, the intermediary computer may determine whether the browser is more or less likely to be a legitimate browser or a bot. In some embodiments, the determination of whether the browser 295 represents a legitimate user or a bot is performed by passing the response from the browser 295 to bot check logic 340.

Bot check logic 340 may determine based, at least in part, on the results of executing the transformed instructions whether browser 295 is a legitimate browser and/or a bot. For example, the intermediary computer 230 at block 504 might store in storage 240 a response expected to be received as a result of executing the transformed instructions. The bot check logic 340 can then inspect the response and compare the response to the expected result that has been previously stored. For instance, the intermediary computer 230 at block 504 might have selected a feature which causes the browser 295 to utilize a specific type of encoding and supplied a random string for the browser 295 to encode using that technique and return in the response. Upon receiving the response, the hot check logic 340 can decode the response and compare it to the previously stored random string to ensure that the browser 295 legitimately performed the encoding. As another example, the intermediary computer 230 may perform a timeout by assuming that the browser 295 is a bot if the response is not received within a threshold period of time. For example, the intermediary computer 230 may keep track of how long it has been since the transformed instructions were sent to the browser 295 and time out after a set period of time. Since a bot might not be able to properly process the transformed instructions, the browser 295 might never respond. For instance, if the instructions to display a form or a set of hyperlinks have been hidden within a syntax or feature that is supported by the purported user agent, but is not supported by the bot, the bot might be unable to extract enough information from the returned web page to generate a new request or post data.

If the bot check logic 340 determines the browser 295 to be a bot, the intermediary computer 230 proceeds to block 511. However, if the bot check logic 340 determines that the browser 295 is not a bot, the intermediary computer 230 proceeds to block 509.

5.4 Responding to a Browser that is Determined to be a Bot

At block 511, the intermediary computer 230 performs one or more countermeasures against the browser 295. For example, the intermediary computer 230 may record identifying information for the browser 295, such as by IP address/port number, in storage 240 in a "black list" that prevents contact with the web infrastructure 205. As a result, when a request is received from a browser which is black listed, the intermediary computer 230 refuses to forward the request on to the web infrastructure 205, effectively shielding the web infrastructure 205 from communicating with the bot.

As another example, instead of black listing the browser 295, the intermediary computer 230 stores an indication, such as a flag associated with identifying information of the browser 295, that causes the intermediary computer 230 to inject more stringent features for the browser 295 to process. For example, the intermediary computer 230 may increase the number of features injected or choose increasingly esoteric features to inject into code received from the web infrastructure 205. Furthermore, in some embodiments, the browser 295 may respond to requests from the browser 295 by supplying fake web pages that do not contain useful content for the bot to process. For example, the fake web page may include hyperlinks that cause the bot to request pages in a loop or request pages that have a different URL but are always contain substantially the same content except for a link to the next fake URL. Thus, preventing the bat from being able to effectively browse the content of the web infrastructure 205. In some embodiments, the browser 295 begins to inject tests that are more invasive to the user, such as causing an alert and/or popup to be displayed for a user to suppress, and report back to intermediary computer 230 how much time elapsed from when the alert was presented until the alert was suppressed. An inhumanely short time elapsing between the alert and the suppression could indicate the presence of a bot. Causing an alert to be presented to a user may interrupt the work flow of a web page, web site, and/or a user. Accordingly, features that cause an alert to be presented on the browser may be considered a more aggressive test.

Additionally or alternatively, in response to determining that a browser is a bot, bot check logic 340 and/or injection logic 336 may perform one or more countermeasures discussed and/or referenced herein. For example, injection logic 336 may send a bot one or more instructions, which when executed by the bot, cause the bot to write massive amount of data to persistent storage, which may hamper and/or crash the bot. As another example, injection logic 336 may send the bot one or more instructions, which when executed by the bot, causes the bat to crash or otherwise malfunction.

Although FIG. 5 illustrates the process ending at block 511, injection logic 336 may send additional browser detection tests and/or countermeasures to browser 295 by injecting the additional browser detection test and/or countermeasures into subsequently intercepted web pages from web infrastructure 205. Thus, in some embodiments, the intermediary computer 230 may process from block 511 to block 509 assuming that the response includes a request for additional content or otherwise requires a response from the web infrastructure 205, such as a new web page. Additionally or alternatively, injection logic 336 may asynchronously send additional browser detection tests and/or countermeasures to browser 295 through AJAX and/or another language and/or protocol.

5.5 Responding to a Browser that is Determined to be Legitimate

At block 510, the intermediary computer 230 performs a reverse transformation on the response from the browser 295. In some cases, features injected into the transformed instructions sent to the browser 295 cause the response to include additional information or information that is presented in a format or syntax different than what would have been expected from executing the original instructions from the web infrastructure 205. Thus, the intermediary computer 230 at block 510 may strip out the additional information and/or utilize the transpiler logic 344 or another feature to convert the format/syntax back to what the web infrastructure 205 would have expected of a browser executing the original structures. In some embodiments, the reverse transformer logic 342 determines which reverse transformations to perform based on the injected features recorded in storage 240 by the injection logic 336.

In some embodiments, if the intermediary computer 230 determines that the browser 295 represents a legitimate user, the intermediary computer 230 may store a record in storage 240 that identifies the browser 295 as legitimate. As a result, when requests are received from the browser 295, the intermediary computer 230 may stop sending, send fewer, and/or send less aggressive, instructions to the browser 295. However, injected features that are included to enhance performance, as opposed to enhance security, may still be injected to optimize the interactions between the browser 295 and the web infrastructure 205. For features which are intended for both a security benefit and a performance benefit, the intermediary computer 230 may still inject those features, but may bypass the bot check logic 340 when processing responses from the browser 295.

6.0 Optimization Only Embodiments

In some embodiments, the intermediary computer 230 is configured to perform optimizations, but not explicitly configured to perform security checks to determine whether the browser 295 is a legitimate user agent or a bot. In such embodiments, one or more elements of intermediary computer 230 depicted in FIG. 3 may be omitted. For example, the intermediary computer 230 may omit the bot check logic 340 and use the remaining components only for the purpose of modifying instructions from the web infrastructure 205 to a form that can be processed quicker by the browser 295, take up less memory, or otherwise optimize the interactions between the browser 295 and the web infrastructure 205. In addition, the intermediary computer 230 may store less information by cutting out records generated in the storage 240 and data in the configurations 232 related to bot detection. For example, the intermediary computer 230 may omit storing expected results of executing transformed instructions to storage 240.

7.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610.

Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8.0 Other Aspects of Disclosure

Using the networked computer arrangements, intermediary computer, and/or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, and/or exploitation of vulnerabilities, are frustrated because object identifiers and/or polymorphic hooks may change over time.

Additional embodiments can be found in the following numbered clauses

1. A method comprising: intercepting, from a client computer, a request directed to a server computer that identifies a purported user agent executing on the client computer; sending, to the server computer, the request from the client computer, intercepting, from the server computer, one or more original instructions to be executed by the purported user agent of the client computer; determining one or more features supported by the purported user agent that are not utilized by the one or more original instructions; transforming the one or more original instructions into one or more revised instructions which, when executed by the purported user agent, causes the purported user agent to utilize the one or more features; sending, to the client computer, the one or more revised instructions.

2. The method of Clause 1, wherein the request is a Hypertext Transfer Protocol (HTTP) request and identifies the purported user agent in a user agent field of a header of the HTTP request.

3. The method of any of Clauses 1-2, wherein the purported user agent is a type of browser and the one or more original instructions represent a web page containing one or more of: Hypertext Markup Language (HTML) instructions, Cascading Style Sheet (CSS) instructions, or JavaScript instructions.

4. The method of any of Clauses 1-3, wherein determining the one or more features supported by the purported user agent is performed based on a support matrix that identifies, for each user agent of a plurality of user agents, which features are supported by the user agent.

5. The method of any of Clauses 1-4, wherein transforming the one or more original instructions into the one or more revised instructions is performed by replacing one or more instances of a first syntax located in the original instructions with one or more instances of a second syntax that is supported by the purported user agent.

6. The method of any of Clauses 1-5, wherein the one or more original instructions include a reference to a function that is unavailable to the purported user agent and transforming the one or more original instructions into the one or more revised instructions is performed by supplying an implementation of the function.

7. The method of any of Clauses 1-6, wherein transforming the one or more original instructions into the one or more revised instructions is performed by replacing a reference to an operation that is not native to the purported user agent with a reference to a different operation that is native to the purported user agent.

8. The method of any of Clauses 1-7, wherein transforming the one or more original instructions into the one or more revised instructions is performed by replacing one or more operations located within the one or more original instructions with one or more operations that are supported by the purported user agent or the client computer.

9. The method of any of Clauses 1-8, further comprising: receiving, from the client computer, a response generated based on the client computer executing the one or more revised instructions; determining, based on the response, whether the client computer is executing the purported user agent or a bot.

10. The method of Clause 9, wherein: transforming the one or more original instructions into the one or more revised instructions is performed by injecting one or more test instructions which cause the client computer to utilize a particular feature of the purported user agent and send back a result of executing the one or more test instructions in the response, and further comprising: in response to receiving the response generated based on the client computer executing the revised instructions, determine whether the client computer is executing the purported user agent or the bot based on comparing the result to an expected result representing a correct utilization of the feature by the client computer.

11. The method of any of Clauses 9-10, further comprising:

in response to determining that the client computer is executing the bot, performing one or more countermeasures against the client computer, wherein the one or more countermeasures include one or more of: blocking communication with the client computer, storing data that causes future instructions sent to the client computer to be transformed with an increased number of injected features or more invasive injected features, or sending instructions to the client computer designed to hinder the client computer.

12. The method of any of Clauses 9-11, further comprising:

in response to determining that the client computer is executing the purported user agent, reverse transform the response to appear as though the client computer executed the one or more original instructions, send the reverse transformed response to the server computer.

13. The method of Clauses 1-12, further comprising: determining one or more features that are not supported by the purported user agent and that are not utilized by the one or more original instructions, wherein, when transforming the one or more original instructions into the one or more revised instructions, the one or more revised instructions attempt to cause the purported user agent to utilize the one or more features that are not supported by the purported user agent.

14. A method comprising: intercepting, from a client computer, a Hypertext Transfer Protocol (HTTP) request directed to a server computer that identifies a purported browser;

sending, to the server computer, the HTTP request from the client computer; intercepting, from the server computer, a web page comprising one or more Hypertext Markup Language (HTML) instructions, one or more Cascading Style Sheets (CSS) instructions, and one or more original JavaScript instructions; determining one or more features supported by the purported browser that are not utilized by the one or more original JavaScript instructions; transforming the one or more original JavaScript instructions into one or more revised JavaScript instructions which, when executed by the purported browser, cause the purported browser to utilize the one or more features; sending, to the client computer, the one or more revised JavaScript instructions.

15. One or more non-transitory computer-readable media storing instructions that, when executed by one or more computing devices, causes performance of any one of the methods recited in Clauses 1-14.

16. A system comprising one or more computing devices comprising components, implemented at least partially by computing hardware, configured to implement the steps of any one of the methods recited in Clauses 1-14.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 230 in FIG. 2 may be described with reference to several components illustrated in FIG. 3 and discussed in detail below, but using the particular arrangement illustrated in FIG. 3 is not required in other embodiments. Furthermore, while the instructions discussed in many example embodiments are HyperText Markup Language ("HTML") and JavaScript instructions, in other embodiments, the instructions intercepted and generated may be any other standard and/or proprietary instructions configured to be executed by a client computer.

What is claimed is:

1. A computer system comprising:
one or more hardware processors;
logic coupled to the one or more processors and configured to:
receive a request from a client computer, wherein the request identifies a purported user agent executing on the client computer;
generate, based on one or more original instructions, one or more revised instructions, wherein the one or more revised instructions include test instructions which, when executed by a user agent executing on the client computer, cause the user agent to attempt to utilize one or more features of the purported user agent, generate a response based on the user agent attempting to utilize the one or more features, and send the response to the computer system;
send, to the client computer, the one or more revised instructions;
receive, from the client computer, a response generated based on the user agent executing on the client computer executing the one or more revised instructions;
determine, based on the response, a user agent that executed the one or more revised instructions;
determine whether the purported user agent corresponds to the user agent that executed the one or more revised instructions.

2. The system of claim 1, wherein the request is a Hypertext Transfer Protocol (HTTP) request and identifies the purported user agent in a user agent field of a header of the HTTP request.

3. The system of claim 1, wherein the purported user agent is a type of browser and the one or more original instructions represent a web page containing one or more of: Hypertext Markup Language (HTML) instructions, Cascading Style Sheet (CSS) instructions, or JavaScript instructions.

4. The system of claim 1, wherein the logic is configured to determine the one or more features of the purported user agent based on a support matrix that identifies, for each user agent of a plurality of user agents, which features are supported by the user agent.

5. The system of claim 1, wherein the logic is configured to generate the one or more revised instructions by replacing one or more instances of a first syntax located in the original instructions with one or more instances of a second syntax that is supported by the purported user agent.

6. The system of claim 1, wherein the one or more original instructions include a reference to a function that is unavailable to the purported user agent and the logic is configured to generate the one or more revised instructions by supplying an implementation of the function.

7. The system of claim 1, wherein the logic is configured to generate the one or more revised instructions by replacing a reference to an operation that is not native to the purported user agent with a reference to a different operation that is native to the purported user agent.

8. The system of claim 1, wherein the logic is configured to generate the one or more revised instructions by replacing one or more operations located within the one or more original instructions with one or more operations that are supported by the purported user agent or the client computer.

9. The system of claim 1, wherein the logic is configured to:
  determine, based on whether the purported user agent corresponds to the user agent that executed the one or more revised instructions, whether the client computer is executing the purported user agent or a bot.

10. The system of claim 9, wherein the response indicates a result of executing the test instructions, and wherein determining the user agent that executed the one or more revised instructions comprises:
  comparing the result to an expected result representing a correct utilization of the one or more features by the client computer.

11. The system of claim 9, wherein the logic is configured to:
  in response to determining that the client computer is executing the bot, performing one or more countermeasures against the client computer, wherein the one or more countermeasures include one or more of: blocking communication with the client computer, storing data that causes future instructions sent to the client computer to be transformed with an increased number of injected features or more invasive injected features, or sending instructions to the client computer designed to hinder the client computer.

12. The system of claim 9, wherein the logic is configured to:
  in response to determining that the client computer is executing the purported user agent, reverse transform the response to appear as though the client computer executed the one or more original instructions.

13. The system of claim 1, wherein the logic is further configured to:
  determine one or more features that are not supported by the purported user agent and that are not utilized by the one or more original instructions, wherein, the test instructions, when executed by the user agent, further cause the user agent to attempt to utilize the one or more features that are not supported by the purported user agent.

14. A computer system comprising:
  one or more hardware processors;
  a logic coupled to the one or more processors and configured to:
  receive a Hypertext Transfer Protocol (HTTP) request from a client computer, wherein the HTTP request identifies a purported browser;
  generate, based on one or more original JavaScript instructions contained in a web page comprising one or more Hypertext Markup Language (HTML) instructions, one or more Cascading Style Sheets (CSS) instructions, and the one or more original JavaScript instructions, one or more revised JavaScript instructions, wherein the one or more revised JavaScript instructions, when executed by a browser on the client computer, cause the browser to attempt to utilize one or more features of the purported browser, generate a response based on the browser attempting to utilize the one or more features, and send the response to the computer system;
  send, to the client computer, the one or more revised JavaScript instructions.

15. A method comprising:
  receiving a request from a client computer, wherein the request identifies a purported user agent executing on the client computer;
  generating, based on one or more original instructions, one or more revised instructions, wherein the one or more revised instructions include test instructions which, when executed by a user agent executing on the client computer, cause the user agent to attempt to utilize one or more features of the purported user agent, generate a response based on the user agent attempting to utilize the one or more features, and send the response;
  sending, to the client computer, the one or more revised instructions;
  receiving, from the client computer, a response generated based on the user agent executing on the client computer executing the one or more revised instructions;
  determine, based on the response, a user agent that executed the one or more revised instructions;
  determine whether the purported user agent corresponds to the user agent that executed the one or more revised instructions;
  wherein the method is performed by one or more computing devices.

16. The method of claim 15, wherein the request is a Hypertext Transfer Protocol (HTTP) request and identifies the purported user agent in a user agent field of a header of the HTTP request.

17. The method of claim 15, wherein the purported user agent is a type of browser and the one or more original instructions represent a web page containing one or more of: Hypertext Markup Language (HTML) instructions, Cascading Style Sheet (CSS) instructions, or JavaScript instructions.

18. The method of claim 15, wherein determining the one or more features of the purported user agent is performed based on a support matrix that identifies, for each user agent of a plurality of user agents, which features are supported by the user agent.

19. The method of claim 15, wherein generating the one or more revised instructions is performed by replacing one or more instances of a first syntax located in the original instructions with one or more instances of a second syntax that is supported by the purported user agent.

20. The method of claim 15, wherein the one or more original instructions include a reference to a function that is unavailable to the purported user agent and generating the one or more revised instructions is performed by supplying an implementation of the function.

21. The method of claim 15, wherein generating the one or more revised instructions is performed by replacing a reference to an operation that is not native to the purported user agent with a reference to a different operation that is native to the purported user agent.

22. The method of claim 15, wherein generating the one or more revised instructions is performed by replacing one or more operations located within the one or more original instructions with one or more operations that are supported by the purported user agent or the client computer.

23. The method of claim 15, further comprising:
determining, based on whether the purported user agent utilized the one or more features, whether the client computer is executing the purported user agent or a bot.

24. The method of claim 23, wherein:
the response indicates a result of executing the test instructions;
determining the user agent that executed the one or more revised instructions comprises comparing the result to an expected result representing a correct utilization of the one or more features by the client computer.

25. The method of claim 23, further comprising:
in response to determining that the client computer is executing the bot, performing one or more countermeasures against the client computer, wherein the one or more countermeasures include one or more of: blocking communication with the client computer, storing data that causes future instructions sent to the client computer to be transformed with an increased number of injected features or more invasive injected features, or sending instructions to the client computer designed to hinder the client computer.

26. The method of claim 23, further comprising:
in response to determining that the client computer is executing the purported user agent, reverse transform the response to appear as though the client computer executed the one or more original instructions.

27. The method of claim 15, further comprising:
determining one or more features that are not supported by the purported user agent and that are not utilized by the one or more original instructions, wherein, the test instructions, when executed by the user agent, further cause the purported user agent to attempt to utilize the one or more features that are not supported by the purported user agent.

28. A method comprising:
receiving a Hypertext Transfer Protocol (HTTP) request from a client computer, wherein the HTTP request identifies a purported browser;
generating, based on one or more original JavaScript instructions contained in a web page comprising one or more Hypertext Markup Language (HTML) instructions, one or more Cascading Style Sheets (CSS) instructions, and the one or more original JavaScript instructions, one or more revised JavaScript instructions, wherein the one or more revised JavaScript instructions, when executed by a browser on the client computer, cause the browser to attempt to utilize one or more features of the purported browser, generate a response based on the browser attempting to utilize the one or more features, and send the response;
sending, to the client computer, the one or more revised JavaScript instructions,
wherein the method is performed by one or more computing devices.

* * * * *